US007636102B2

(12) United States Patent
Kimura

(10) Patent No.: US 7,636,102 B2
(45) Date of Patent: Dec. 22, 2009

(54) OPTICAL SCANNING APPARATUS AND IMAGE-FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/196,986

(22) Filed: Aug. 22, 2008

(65) Prior Publication Data

US 2009/0015650 A1 Jan. 15, 2009

Related U.S. Application Data

(62) Division of application No. 11/400,673, filed on Apr. 7, 2006, now Pat. No. 7,439,999.

(30) Foreign Application Priority Data

Apr. 28, 2005 (JP) ............................ 2005-132579

(51) Int. Cl.
*G02B 26/10* (2006.01)
*B41J 2/447* (2006.01)
*B41J 2/455* (2006.01)

(52) U.S. Cl. ...................................................... 347/244

(58) Field of Classification Search ................. 347/241, 347/243, 244, 256, 258, 259
See application file for complete search history.

(56) References Cited

U.S. PATENT DOCUMENTS 6,201,561 B1 3/2001 Ichikawa
6,388,792 B1 5/2002 Atsuumi et al.
2004/0104994 A1 6/2004 Ishihara et al.
2006/0033799 A1 2/2006 Ishihara et al.

FOREIGN PATENT DOCUMENTS

JP 2-157809 A 6/1990
JP 9-90254 A 4/1997
JP 2000-121977 A 4/2000
JP 2001-021824 A 1/2001
JP 2002-40350 * 2/2002
JP 2003-156704 A 5/2003
JP 2004-70108 A 3/2004

OTHER PUBLICATIONS

Computer-generated translation of JP 2002-040350, published on Feb. 2002.*

* cited by examiner

*Primary Examiner*—Huan H Tran
(74) *Attorney, Agent, or Firm*—Canon U.S., Inc., IP Division

(57) ABSTRACT

At least one exemplary embodiment is directed to an optical scanning apparatus which includes a Vertical Cavity Surface Emitting Laser including a plurality of light-emitting portions that are spaced from each other in at least a sub-scanning direction, a first optical system including a light-condensing element that converts each of light beams from the laser into a light beam in another state; a deflector that reflects and deflects the light beams from the first optical system, and a second optical system that focuses the light beams deflected by the deflecting member on a surface to be scanned, where the second optical system includes at least an imaging optical element having an optical surface with a non-arc shape in a sub-scanning cross section.

7 Claims, 22 Drawing Sheets

OPTICAL SCANNING APPARATUS AND IMAGE-FORMING APPARATUS USING THE SAME

CROSS REFERENCE TO RELATED APPLICATIONS

This application is a divisional application pursuant to 37 CFR § 1.53(b) of co-pending U.S. patent application Ser. No. 11/400,673 filed Apr. 7, 2006, which claims the benefit of Japanese Application No. 2005-132579 filed Apr. 28, 2005, both of which are hereby incorporated by reference herein in their entirety.

BACKGROUND OF THE INVENTION

1. Field of the Invention

The present invention relates to an optical scanning apparatus and an image-forming apparatus using the optical scanning apparatus.

2. Description of the Related Art

Various optical scanning apparatus for use in image-forming apparatuses (e.g., laser beam printers, digital copy machines, and multifunction printers that perform electrophotography processes) have been suggested (see Japanese Patent Laid-Open No. 2003-156704).

In this type of optical scanning apparatus, a light beam emitted from a light source unit including a semiconductor laser is collimated by a collimating lens and is guided to a deflecting-reflecting surface (deflecting surface) of a light deflector including a rotating polygon mirror. The light beam deflected by the light deflector is caused to form a spot image on a surface by an imaging optical system (fθ lens system), and this surface is scanned with the light beam at a constant speed. This type of optical scanning apparatus includes a so-called surface-tilt-correction optical system in which the substantially collimated light beam output from the collimating lens is collected at or near the deflecting-reflecting surface in a sub-scanning direction (sub-scanning cross section) perpendicular to the deflecting direction (main-scanning direction) by a cylindrical lens and is then caused to form the spot image on a surface to be scanned by the imaging optical system.

Recently, demand for high-speed and high-definition printing performance of image-forming apparatuses (e.g., laser beam printers, digital copy machines, and multifunction printers) has increased. To achieve either high-speed printing or high-definition printing, it can be necessary in some circumstances to increase the number of times the surface is scanned per unit time. Accordingly, the number of surfaces and the rotating speed of the rotating polygon mirror have been increased.

However, in this case, the size of the rotating polygon mirror and load placed on a drive motor are increased. Therefore, new problems arise that the temperature and noise are increased and the overall size cannot be reduced.

Accordingly, in order to reduce the load placed on the light deflector, various types of multi-beam scanning methods have been suggested in which the number of light-emitting portions included in a semiconductor laser that can function as the light source unit is increased and a plurality of light beams are contemporaneously deflected and caused to scan a surface to be scanned.

There are two major types of light sources used in the multi-beam scanning methods:

A first type in which a plurality of light-source elements which each emit a single laser beam can be arranged and a plurality of light beams can be obtained using optical-path-combining units (e.g., polarizing beam splitters and half mirrors); and A second type called a monolithic multi-beam type in which a plurality of light-emitting portions can be arranged on a single light-source element.

Although light sources of the first type can be easily manufactured using simple (inexpensive) single laser emitting elements, there is a problem that the overall structure is complex and large because the beam-combining units are necessary. In comparison, in the monolithic multi-beam type, no beam-combining unit is necessary and accordingly the structure of the optical scanning apparatus can be made simpler and smaller.

There are two major types of monolithic multi-beam light-source elements: horizontal emission type and vertical emission type. Each type of light-source element is manufactured by a semiconductor process and has a layered structure formed on a wafer substrate. The beam is emitted horizontally from the layered structure in the horizontal emission type and vertically in the vertical emission type.

In general, semiconductor lasers of the horizontal emission type are mainly used because they can be easily manufactured. In multi-beam light sources of the horizontal emission type, beams can be arranged one-dimensionally. The horizontal emission type is also called an edge emitter type.

In the vertical emission type, light-emitting portions can be arranged two-dimensionally on the substrate surface because the light beams are emitted vertically with respect to the substrate surface. Accordingly, the laser sources of this type are called Vertical Cavity Surface Emitting Lasers. The Vertical Cavity Surface Emitting Lasers are advantageous in that the number of light-emitting portions can be easily increased by arranging them two-dimensionally, and have recently been attracting considerable attention.

On the other hand, optical elements included in imaging lenses of the optical scanning apparatus are generally formed by molding using a mold. Molding is advantageous in that lenses having complex shapes can be easily manufactured with high reliability once the mold is obtained. Accordingly, optical elements having aspherical surfaces are often manufactured by molding so that the optical performance can be increased and the number of lenses can be reduced. In particular, various lens structures having surfaces aspherical in the main-scanning direction have been suggested to reduce the comma aberration and improve the fθ characteristics.

In addition, various kinds of optical scanning apparatuses including lens surfaces aspherical in the sub-scanning direction have also been suggested (see Japanese Patent Laid-Open Nos. 2001-021824, 2-157809, 9-90254, 2000-121977, and 2004-70108).

The above-mentioned optical scanning apparatuses provide two major effects:

Wave aberration (spherical aberration) in the sub-scanning direction is reduced (Japanese Patent Laid-Open Nos. 2001-021824, 2-157809, and 9-90254); and Scan-line curvature is reduced (Japanese Patent Laid-Open Nos. 2000-121977 and 2004-70108).

The structures according to Japanese Patent Laid-Open Nos. 2001-021824, 2-157809, and 9-90254 compensate for a displacement between a paraxial image plane and a best-spot image plane caused by the influence of the spherical aberration generated due to an increase in the width of the light beam in the sub-scanning direction.

In the structures according to Japanese Patent Laid-Open Nos. 2000-121977 and 2004-70108, the light beam incident at an angle passes through an imaging lens surface at a position separated from the optical axis in the sub-scanning cross section. Accordingly, the irradiation height of the image point on the surface to be scanned is largely shifted from the optical axis due to the spherical aberration of the imaging lens, which generates the scan-line curvature. The above-mentioned structures are provided to reduce this scan-line curvature.

The above-described Vertical Cavity Surface Emitting Laser that emits an increased number of beams from two-dimensionally arranged light-emitting portions can have a certain field angle to reduce jitter in the main scanning direction.

The jitter in the main-scanning direction will be explained below. Since the light-emitting portions included in the laser chip are separated from each other and gaps with a certain width are provided between the spots in the main-scanning direction, two light beams propagate at an angle with respect to each other in the main-scanning direction. Accordingly, the polygon mirror is at different rotational positions when the two light beams are incident on (scan) the same point on the photosensitive drum in the main-scanning direction, which means that the two light beams can be incident on that point at different times. Therefore, the positions (distances from the optical axis) at which the two light beams pass through the imaging lens (fθ lens) also differ from each other in the main-scanning direction, and sufficient effects cannot be obtained due to differences between the positions at which the light beams pass through the imaging lens in the main-scanning direction. In other words, since the principal rays of the light beams are incident on the polygon mirror at different positions, the light beams that travel toward the same image height in the main-scanning direction pass through the imaging lens at different positions. This causes the jitter in the main-scanning direction.

The jitter in the main-scanning direction can be reduced by arranging the laser source such that the field angle in the main-scanning direction is reduced, that is, such that the field angle in the sub-scanning direction is increased.

However, when the field angle in the sub-scanning direction is increased, the following problems occur:

A field curvature between the beams occurs in the sub-scanning cross section; and The gaps between the beams become uneven due to a distortion (DIST) in the sub-scanning cross section.

For example, FIGS. 21 and 22 show aberrations obtained when a collimating lens with a focal length (F) of 16.3 and a cylindrical lens with a focal length (F) of 36.0 in the sub-scanning direction are included in the incident optical system according to Japanese Patent Laid-Open No. 2003-156704 and a Vertical Cavity Surface Emitting Laser having a field angle in the sub-scanning direction is used as a laser source.

FIG. 21 illustrates a graph of the paraxial image plane in the sub-scanning direction, where the vertical axis illustrates the paraxial image plane in the sub-scanning direction (sub-scan image plane) and the horizontal axis illustrates the image height (scan image height) on a surface to be scanned in the main-scanning direction. The graph illustrates the case in which the light-emitting portions of the laser source can be arranged such that the field angle is varied with 0.02 mm pitch in the range of Z=0.000 mm to 0.100 mm in terms of the distance from the optical axis of the collimating lens in the sub-scanning direction.

As is clear from FIG. 21, as the field angle in the sub-scanning direction (sub-scan field angle) of the light-emitting portions is increased, the sub-scan image plane is shifted in the negative direction and accordingly a field curvature occurs.

The sub-scan image plane is particularly largely shifted in a region where the scan image height is near the axis. The sub-scan image plane is curved with respect to the sub-scan field angle (Z=0.000 mm to 0.100 mm for the field angle of the laser source).

Although the shift of the sub-scan image plane is small if the sub-scan field angle is small (around Z=0.02 mm for the field angle of the laser source), it cannot be ignored when the Vertical Cavity Surface Emitting Laser is used and the sub-scan field angle is increased.

FIG. 22 illustrates a graph of the irradiation height of the image point on a surface to be scanned in the sub-scanning direction, where the horizontal axis illustrates the image height on the surface to be scanned in the main-scanning direction (scan image height) and the vertical axis illustrates the irradiation height of the image point in the sub-scanning direction. The graph illustrates the case in which the light-emitting portions of the laser source can be arranged such that the field angle is varied with 0.02 mm pitch in the range of Z=0.000 mm to 0.100 mm in terms of the distance from the optical axis of the collimating lens in the sub-scanning direction.

As is clear from FIG. 22, when the sub-scan field angle of the light-emitting portions is large, the irradiation height of the image point in the sub-scanning direction is shifted in the positive direction as the image height in the main scanning direction is increased. Accordingly, a scan-line curvature occurs.

This means that the gap between the beams in the sub-scanning direction (sub-scan pitch) varies depending on the main-scan image height.

The amount of variation is particularly large in regions where the scan image height is large, and distortion (DIST) in the sub-scanning direction occurs in these regions.

Although the variation in the sub-scan pitch between the beams is small if the sub-scan field angle is small (around Z=0.02 mm for the field angle of the laser source), it cannot be ignored when the Vertical Cavity Surface Emitting Laser is used and the sub-scan field angle is increased.

Japanese Patent Laid-Open No. 2001-021824 discusses an aberration correction structure for a light source emitting a plurality of beams arranged such that the light source has a field angle in the sub-scanning direction. However, in this structure, the field angle in the sub-scanning direction is assumed to be around ±0.021 mm or less, which corresponds to the cases where the field angle is very small in the graphs shown in FIGS. 21 and 22.

In addition, the specification of Japanese Patent Laid-Open No. 2001-021824 discusses no concept for compensating for the differences in aberrations between the beams.

In addition, there is another problem in that the influence of wave aberration is increased when the beam diameter in the sub-scanning direction is increased to reduce the spot size.

To correct this, in the structure according to Japanese Patent Laid-Open No. 2001-021824, a surface where the beam diameter in the sub-scanning direction is at a maximum is designed to be aspherical. However, this is not sufficient for a light source arranged to have a field angle in the sub-scanning direction.

This is because a light beam with a field angle in the sub-scanning direction can cause a coma aberration when the light beam passes through an optical surface at a position separated from the optical axis and the coma aberration is increased as the light beam width is increased.

Therefore, the comma aberrations caused by light beams that pass through a lens surface at different positions cannot be sufficiently reduced by the structure according to Japanese Patent Laid-Open No. 2001-021824.

SUMMARY OF THE INVENTION

At least one exemplary embodiment is directed to an optical scanning apparatus that can be used in an image-forming apparatus (e.g., a laser beam printer (LBP), a digital copy machine, and a multifunction printer that performs electro-photography processes, and other image-forming apparatus as conventional by one of ordinary skill in the relevant arts and equivalents).

At least one exemplary embodiment is directed to an optical scanning apparatus that reliably corrects and/or reduces aberrations including field curvature and distortion (DIST) in a sub-scanning cross section to provide good/improved optical performance and an image-forming apparatus using the optical scanning apparatus.

At least one exemplary embodiment is also directed to an optical scanning apparatus using a Vertical Cavity Surface Emitting Laser as a light source unit and forming an image by contemporaneously deflecting and scanning a plurality of light beams, which can have a large field angle in the sub-scanning direction, and an image-forming apparatus using the optical scanning apparatus.

According to an exemplary embodiment of the present invention, an optical scanning apparatus includes a Vertical Cavity Surface Emitting Laser including a plurality of light-emitting portions that are spaced from each other in at least a sub-scanning direction; a first optical system including a light-condensing element that converts each of light beams from the laser source into a light beam in another state; a deflector that reflects and deflects the light beams from the first optical system; and a second optical system that focuses the light beams deflected by the deflecting member on a surface to be scanned, the second optical system including at least an imaging optical element having an optical surface with a non-arc shape in a sub-scanning cross section. When the number of the light-emitting portions is N, the focal length of the light-condensing element is Fcol (mm), the maximum effective image circle diameter of the light-condensing element is IS (mm), the imaging magnification of the second optical system in the sub-scanning direction is $\beta_{F\theta}$, and the distance between the light beams on the a surface to be scanned in the sub-scanning direction is 25.4/DPI (mm), the following expression is satisfied:

$$0.18\ (\text{mm}) \leqq (N-1)\times F\text{col}/(IS\times\beta_{F\theta}\times DPI) \leqq 12.00\ (\text{mm}).$$

In the optical scanning apparatus of at least one exemplary embodiment, the following expression can also be satisfied:

$$0.24\ (\text{mm}) \leqq (N-1)\times F\text{col}/(IS\times\beta_{F\theta}\times DPI) \leqq 8.78\ (\text{mm}).$$

The optical scanning apparatus can further include a diaphragm disposed between the laser source and the deflector and an optical surface of an optical element disposed between the diaphragm and the deflector and being adjacent to the diaphragm can have a non-arc shape in the sub-scanning cross section.

In the optical scanning apparatus, variation directions of field curvatures caused by the first optical system and the second optical system in the sub-scanning direction due to variation in a field angle in the sub-scanning direction can be opposite to each other.

In addition, variation directions of distortions caused by the first optical system and the second optical system in the sub-scanning direction due to variation in a field angle in the sub-scanning direction can be opposite to each other.

In addition, according to another exemplary embodiment of the present invention, an optical scanning apparatus includes a Vertical Cavity Surface Emitting Laser including a plurality of light-emitting portions that are spaced from each other in at least a sub-scanning direction; a first optical system including a light-condensing element that converts each of light beams from the laser source into a light beam in another state; a deflector that reflects and deflects the light beams from the first optical system; and a second optical system that focuses the light beams deflected by the deflecting member on a surface to be scanned, the second optical system including an imaging optical element having an optical surface with a non-arc shape in a sub-scanning cross section. A principal ray of a light beam emitted from one of the light-emitting portions, that is farthest from an optical axis in the sub-scanning cross section, passes through a plurality of optical elements included in the first and second optical systems, the principal ray being farthest from the optical axis in the sub-scanning cross section when the principal ray passes through the optical surface of the imaging optical element. In addition, when the focal length of the light-condensing element is Fcol (mm), the distance between the optical axis and the light-emitting portion that is farthest from the optical axis in the sub-scanning cross section is $L_0$, the distance between the optical surface of the imaging optical element and the deflector along the optical axis direction is SI, the imaging magnification of the first optical system in the sub-scanning direction is $\beta_0$, and the F-number of the entrance side of the light-condensing element in the sub-scanning cross section is Fno, the following expression can be satisfied:

$$0.10<|(SI/F\text{col}+\beta_0)\times L_0/(SI/(F\text{no}\times\beta_0\times 2)|<5.43.$$

According to another exemplary embodiment of the present invention, an optical scanning apparatus includes a Vertical Cavity Surface Emitting Laser including a plurality of light-emitting portions that are spaced from each other in at least a sub-scanning direction; a first optical system including a light-condensing element that converts each of light beams from the laser source into a light beam in another state; a deflector that reflects and deflects the light beams from the first optical system; a diaphragm disposed between the laser source and the deflector and having an optical surface with a non-arc shape in a sub-scanning cross section; and a second optical system that focuses the light beams deflected by the deflecting member on a surface to be scanned. A principal ray of a light beam emitted from one of the light-emitting portions that is farthest from an optical axis in the sub-scanning cross section passes through a plurality of optical elements included in the first and second optical systems, the principal ray being farthest from the optical axis in the sub-scanning cross section when the principal ray passes through the optical surface of the diaphragm.

Also in this optical scanning apparatus, variation directions of field curvatures caused by the first optical system and the second optical system in the sub-scanning direction due to variation in a field angle in the sub-scanning direction can be opposite to each other.

In addition, variation directions of distortions caused by the first optical system and the second optical system in the sub-scanning direction due to variation in a field angle in the sub-scanning direction can be opposite to each other.

In addition, according to another exemplary embodiment of the present invention, an image-forming apparatus includes the above-described optical scanning apparatus, a photosensitive body disposed on the surface to be scanned; a developing device that can form a toner image by developing an electrostatic latent image formed on the photosensitive body by the light beams emitted from the optical scanning apparatus; a transferring device that transfers the developed toner image onto a transferring material; and a fixing device that fixes the toner image transferred onto the transferring material.

In addition, according to another exemplary embodiment of the present invention, an image-forming apparatus includes the above-described optical scanning apparatus and a printer controller that converts code data received from an external device into an image signal and inputs the image signal to the optical scanning apparatus.

In addition, according to another exemplary embodiment of the present invention, a color-image-forming apparatus includes a plurality of the above-described optical scanning apparatus and a plurality of image carriers respectively arranged on the surface to be scanned of the optical scanning apparatus and forming images of different colors.

The color-image-forming apparatus can further include a printer controller that converts color signals input from an external device into color image data elements and inputs the color image data elements to the respective optical scanning apparatus.

Accordingly, at least one embodiment of the present invention provides is directed to an optical scanning apparatus that reduces aberrations including field curvature and distortion (DIST) in the sub-scanning cross section and provides good optical performance even when a Vertical Cavity Surface Emitting Laser is used as a light source unit and an image-forming apparatus including the optical scanning apparatus.

Further features will become apparent from the following description of exemplary embodiments with reference to the attached drawings.

DESCRIPTION OF THE EMBODIMENTS

Figure 1A:
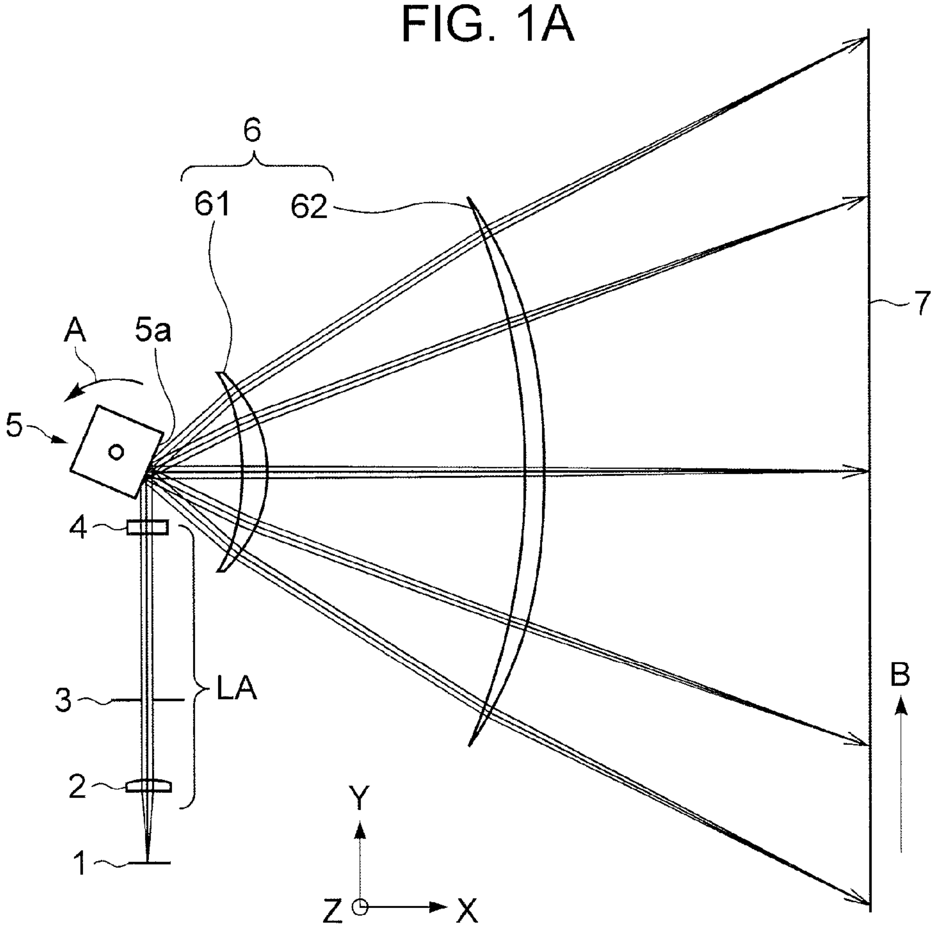
FIG. 1A illustrates a main-scanning cross section according to a first exemplary embodiment of the present invention.

The following description of at least one exemplary embodiment is merely illustrative in nature and is in no way intended to limit the invention, its application, or uses.

Processes, techniques, apparatus, and materials as conventional by one of ordinary skill in the relevant art may not be discussed in detail but are intended to be part of the enabling description where appropriate, for example the fabrication of the lens and mirror elements and their materials.

In all of the examples illustrated and discussed herein, any specific values, for example pitch values and focal lengths, should be interpreted to be illustrative only and no limiting. Thus, other examples of the exemplary embodiments could have different values.

Notice that similar reference numerals and letters refer to similar items in the following figures, and thus once an item is defined in one figure, it may not be discussed for following figures.

Exemplary embodiments will be described below with reference to the accompanying drawings.

First Exemplary Embodiment

Figure 1B:
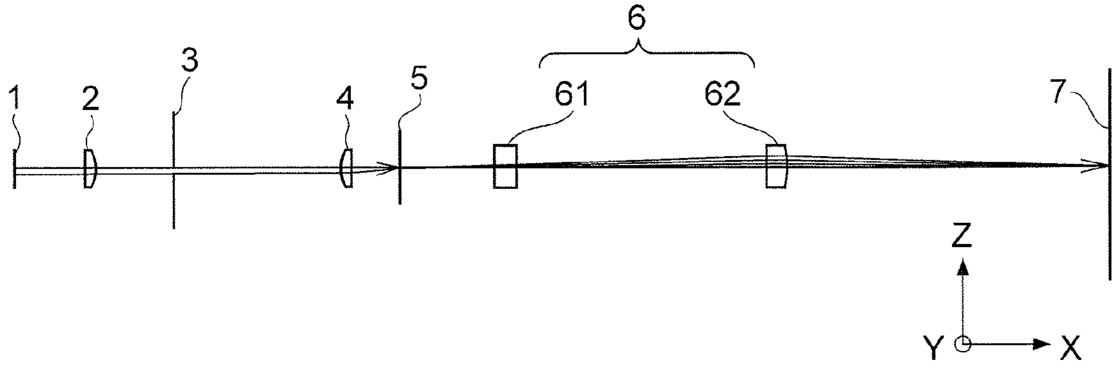
FIG. 1B illustrates a sub-scanning cross section according to the first exemplary embodiment of the present invention.

FIG. 1A illustrates a cross section of the main part of an optical scanning apparatus according to a first exemplary embodiment of the present invention taken along a main-scanning direction (main-scanning cross section) and FIG. 1B illustrates a cross section of the main part of the optical scanning apparatus according to the first exemplary embodiment of the present invention taken along a sub-scanning direction (sub-scanning cross section).

The main-scanning direction refers to a direction perpendicular to a rotating axis of, for example, a rotating polygon mirror and/or an optical axis of an imaging optical system (that is, a direction in which light beams are reflectively deflected (deflected and scanned) by the rotating polygon mirror. The sub-scanning direction refers to a direction parallel to the rotating axis of the rotating polygon mirror. The main-scanning cross section refers to a plane including the main-scanning direction and the optical axis of the imaging optical system and the sub-scanning cross section refers to a plane perpendicular to the main-scanning cross section.

The structure shown in FIGS. 1A and 1B and the optical operation thereof will be described below.

Referring to the figures, a Vertical Cavity Surface Emitting Laser 1 includes a plurality of light-emitting portions that can be arranged in the sub-scanning direction with gaps provided therebetween.

A collimating lens (condenser lens) 2 can function as a light-condensing unit and converts the light beams emitted from the light source 1 into substantially collimated light beams.

An aperture diaphragm 3 limits the light beams passing therethrough to adjust the beam shapes (elliptical in cross section perpendicular to the optical axis).

A lens system (cylindrical lens) 4 has a predetermined power in the sub-scanning direction and causes the light beams that pass through the aperture diaphragm 3 to form substantially linear images on a deflecting surface (reflecting surface) 5a of a light deflector 5, which will be described below, in the sub-scanning cross section.

The elements including the collimating lens 2, the aperture diaphragm 3, and the cylindrical lens 4 are included in a first optical unit (incident optical system) LA. The functions of the collimating lens 2 and the cylindrical lens 4 can also be obtained by a single optical element (anamorphic lens).

The light deflector 5 can function as a deflecting unit and includes, for example, a four-surface rotating polygon mirror inscribed in a $\phi$20 circle (circle with a diameter of 20 mm). The light deflector 5 is rotated by a driving unit (not shown), such as a motor, at a constant speed in the direction shown by the arrow A. In the present non-limiting example of at least one exemplary embodiment, the width of the deflecting-reflecting surfaces (deflecting surfaces) 5a of the polygon mirror 5 in the main-scanning direction is 14.1 mm.

An imaging optical system (f$\theta$ lens system) 6 can function as a second optical unit and includes first and second imaging lenses 61 and 62 (e.g., made of resin (plastic)). The imaging optical system 6 causes the light beams based on image information that are reflected and deflected by the light deflector 5 to form images on a photosensitive drum surface 7 that can function as a surface to be scanned. In addition, the imaging optical system 6 performs surface-tilt correction by establishing a conjugate relationship between the deflecting surface 5a of the light deflector 5 and the photosensitive drum surface 7 in the sub-scanning cross section.

The first and second imaging lenses 61 and 62 (e.g., made of resin) can be manufactured by several conventional processes (e.g., a molding process in which resin is injected into a mold and is taken out from the mold after being cooled). Accordingly, if the imaging lenses 61 and 62 are made of moldable material they can be easily manufactured with low cost compared to conventional imaging lenses made of glass.

The first imaging lens 61 can have a positive power mainly in the main-scanning direction, as illustrated in Table 1-1 which will be described below, and has aspherical lens surfaces with shapes expressed by Equations (a) to (d) which will also be described below.

The first imaging lens 61 has a higher power in the main-scanning cross section (main-scanning direction) than in the sub-scanning cross section (sub-scanning direction). In the main-scanning cross section, the first imaging lens 61 can have a meniscus shape and the entrance surface thereof is non-arc and concave toward the light deflector 5. In the sub-scanning cross section, the first imaging lens 61 can have a cylindrical shape in which both the entrance and exit surfaces are flat in the sub-scanning direction. However, it is not necessary that the entrance and exit surfaces be completely flat, and the first imaging lens 61 can also have a certain power in the sub-scanning cross section.

The first imaging lens 61 focuses the light beams incident thereon mainly in the main-scanning direction.

The second imaging lens 62 is an anamorphic lens having different powers in the main-scanning direction and the sub-scanning direction, as illustrated in Table 1-1 which will be described below. The entrance and exit surfaces of the second imaging lens 62 are aspherical surfaces having shapes corresponding to Expressions A and B, respectively, as illustrated in Table 1-1. The exit surface has a non-arc shape in the sub-scanning cross section.

The second imaging lens 62 can have a higher power in the sub-scanning cross section than in the main-scanning cross section. In the main-scanning cross section, the entrance surface of the second imaging lens 62 has an arc shape and the exit surface thereof has a non-arc shape.

The second imaging lens 62 has a lens shape that is asymmetric with respect to the optical axis in the main-scanning cross section, and has substantially no power in the main-scanning direction in a region around the optical axis. In the sub-scanning cross section, the entrance surface of the second imaging lens 62 has a concave shape with a small curvature. In addition, the exit surface has a non-arc convex shape with a curvature that gradually changes as the distance from the optical axis is increased, and is asymmetric with respect to the optical axis.

The second imaging lens 62 focuses the light beams incident thereon mainly in the sub-scanning direction. In addition, the second imaging lens 62 also serves a certain distortion-correcting function in the main-scanning direction.

It is not necessary to express the shapes of the first and second imaging lenses 61 and 62 with the functional expressions using the aspherical values shown in Table 1-1, and other conventional expressions or equivalent expressing methods can also be used. In addition, it is not necessary that the first and second imaging lenses 61 and 62 be symmetric or asymmetric with respect to the optical axis as illustrated in Table 1-1, and other conventional structures can also be applied.

The photosensitive drum surface 7 can function as the surface to be scanned.

Table 1-1 shows data of the optical scanning apparatus according to the present exemplary embodiment. The unit of length is mm, the unit of angle is degree, and the unit of resolution is dot/inch. This applies to a substantial portion of the following exemplary embodiments.

TABLE 1-1

| | Surface No. | Curvature (Main) | Curvature (Sub) | Surface Gap | Refractive Index |
|---|---|---|---|---|---|
| Light Source 1 | 0 | | | 18.245 | |
| Collimating Lens 2 R1 | 1 | ∞ | ∞ | 3.000 | 1.762 |
| Collimating Lens 2 R2 | 2 | −15.216 | −15.216 | 19.982 | |
| Diaphragm 3 | 3 | ∞ | ∞ | 42.889 | |
| Cylindrical Lens 4 R1 | 4 | ∞ | 10.8 | 3.000 | 1.762 |
| Cylindrical Lens 4 R2 | 5 | ∞ | ∞ | 12.800 | |
| Polygon Mirror 5 | 6 | ∞ | ∞ | 24.200 | |
| First Imaging Lens 61 R1 | 7 | Aspherical (see below) | Aspherical (see below) | 6.000 | 1.524 |
| First Imaging Lens 61 R2 | 8 | Aspherical (see below) | Aspherical (see below) | 65.500 | |
| Second Imaging Lens 62 R1 | 9 | Aspherical (see below) | Aspherical (see below) | 5.000 | 1.524 |
| Second Imaging Lens 62 R2 | 10 | Aspherical (see below) | Aspherical (see below) | 83.559 | |
| A surface to be scanned 7 | 11 | | | | |

| | |
|---|---|
| Fθ Coefficient | 150.0 |
| Sub-scan Magnification of Fθ Lens | 1.02 |
| Focal Length of Collimating Lens 2 | 20.0 |
| Focal Length of Cylindrical Lens 4 | 14.2 |
| Shape of Diaphragm | Elliptical Main: 3.20 * Sub: 0.24 |
| Deflector | Circumcircle ϕ20/Four Reflecting Surfaces |

| Meridional Line (Upper) | | Meridional Line (Lower) | | Sagittal Line (Upper) | | Sagittal Line (Lower) | |
|---|---|---|---|---|---|---|---|
| **Seventh Surface Expression A** | | | | | | | |
| R | | −5.57E+01 | | r | | ∞ | |
| Ku | 2.80E+00 | Kl | 2.80E+00 | D2u | 0.00E+00 | D2l | 0.00E+00 |
| B4u | 3.73E−06 | B4l | 3.73E−06 | D4u | 0.00E+00 | D4l | 0.00E+00 |
| B6u | −5.68E−09 | B6l | −5.68E−09 | D6u | 0.00E+00 | D6l | 0.00E+00 |
| B8u | 5.27E−12 | B8l | 5.27E−12 | D8u | 0.00E+00 | D8l | 0.00E+00 |
| B10u | 3.72E−15 | B10l | 3.72E−15 | D10u | 0.00E+00 | D10l | 0.00E+00 |
| **Eighth Surface Expression A** | | | | | | | |
| R | | −3.31E+01 | | r | | ∞ | |
| Ku | −2.04E−01 | Kl | −2.04E−01 | D2u | 0.00E+00 | D2l | 0.00E+00 |
| B4u | 1.17E−06 | B4l | 1.17E−06 | D4u | 0.00E+00 | D4l | 0.00E+00 |
| B6u | −7.73E−11 | B6l | −7.73E−11 | D6u | 0.00E+00 | D6l | 0.00E+00 |
| B8u | −9.91E−12 | B8l | −9.91E−12 | D8u | 0.00E+00 | D8l | 0.00E+00 |
| B10u | 8.20E−15 | B10l | 8.20E−15 | D10u | 0.00E+00 | D10l | 0.00E+00 |
| **Ninth Surface Expression A** | | | | | | | |
| R | | −1.86E+02 | | r | | −2.44E+01 | |
| Ku | 0.00E+00 | Kl | 0.00E+00 | D2u | 1.25E−05 | D2l | 1.25E−05 |
| B4u | 0.00E+00 | B4l | 0.00E+00 | D4u | 9.72E−09 | D4l | 9.72E−09 |
| B6u | 0.00E+00 | B6l | 0.00E+00 | D6u | 0.00E+00 | D6l | 0.00E+00 |
| B8u | 0.00E+00 | B8l | 0.00E+00 | D8u | 0.00E+00 | D8l | 0.00E+00 |
| B10u | 0.00E+00 | B10l | 0.00E+00 | D10u | 0.00E+00 | D10l | 0.00E+00 |
| **Tenth Surface Expression B** | | | | | | | |
| R | | −2.38E+02 | | | | | |
| Ku | −5.63E+01 | Kl | −4.63E+01 | | | | |
| B4u | −8.27E−07 | B4l | −8.27E−07 | | | | |
| B6u | 1.07E−10 | B6l | 1.07E−10 | | | | |
| B8u | −1.05E−14 | B8l | −1.05E−14 | | | | |
| B10u | 0.00E+00 | B10l | 0.00E+00 | | | | |
| E02 | −2.30E−02 | | | | | | |
| E12 | 1.34E−06 | | | | | | |
| E04 | 3.53E−07 | | | | | | |
| E22 | 1.16E−06 | | | | | | |
| E14 | −7.53E−09 | | | | | | |
| E32 | 3.74E−10 | | | | | | |
| E24 | −8.02E−10 | | | | | | |
| E42 | −5.74E−10 | | | | | | |
| E52 | −5.36E−14 | | | | | | |
| E44 | 1.43E−12 | | | | | | |
| E62 | 1.28E−13 | | | | | | |
| E64 | −3.18E−16 | | | | | | |
| E82 | −1.50E−17 | | | | | | |

Surface Shapes of First and Second Imaging Lenses 61 and 62: Expression A Expression A that defines the surface shapes of the first and second imaging lenses 61 and 62 is determined as described below.

When a surface has an aspherical shape that can be expressed by a function of tenth or lower order and when an intersection of the surface and the optical axis is the origin, x axis extends in the optical-axis direction, y axis extends perpendicular to the optical axis in the main-scanning plane, and the z axis extends perpendicular to the x axis in the sub-scanning plane, the shape of the surface in a meridional direction, which corresponds to the main-scanning direction, is expressed as follows:

$$x = \frac{Y^2/R}{1+(1-(1+K)(Y/R)^2)^{1/2}} + B_4Y^4 + B_6Y^6 + B_8Y^8 + B_{10}Y^{10} \quad \text{(a)}$$

where R is the radius of curvature and K, $B_4$, $B_6$, $B_8$, and $B_{10}$ are aspherical surface coefficients.

In addition, the shape of the surface in a sagittal direction, which corresponds to the sub-scanning direction (direction perpendicular to the optical axis and the main-scanning direction), is expressed as follows:

$$S = \frac{Z^2/r'}{1+(1-(Z/r')^2)^{1/2}} \quad \text{(b)}$$

where r' is calculated as $r'=r_0(1+D_2Y^2+D_4Y^4+D_6Y^6+D_8Y^8+D_{10}Y^{10}$, and where $r_0$ is the radius of curvature in the sagittal direction on the optical axis and $D_2$, $D_4$, $D_6$, $D_8$, and $D_{10}$ are coefficients.

Surface Shape of Second Imaging Lens 62: Expression B

Expression B that defines the surface shape of the second imaging lens 62 which can have an aspherical surface in the sub-scanning cross section is determined as described below.

When a surface has an aspherical shape that can be expressed by a function of tenth or lower order and when an intersection of the surface and the optical axis is the origin, x axis extends in the optical-axis direction, y axis extends perpendicular to the optical axis in the main-scanning plane, and the z axis extends perpendicular to the x axis in the sub-scanning plane, the shape of the surface in a meridional direction, which corresponds to the main-scanning direction, is expressed as follows:

$$x = \frac{Y^2/R}{1+(1-(1+K)(Y/R)^2)^{1/2}} + B_4Y^4 + B_6Y^6 + B_8Y^8 + B_{10}Y^{10} \quad \text{(c)}$$

where R is the radius of curvature and K, $B_4$, $B_6$, $B_8$, and $B_{10}$ are aspherical surface coefficients.

In addition, the amount of sag S' from the meridional line in the sagittal direction that corresponds to the sub-scanning direction (direction perpendicular to the optical axis and the main-scanning direction) is expressed as follows:

$$S'=\Sigma E_{ij}Y^iZ^j \quad \text{(d)}$$

where $E_{ij}$ is a coefficient, and where i and j are positive integers. In the above equation, j=2 corresponds to a spherical component in the sub-scanning direction and j≠2 gives the amount of aspheric deformation that defines the non-arc shape in the sub-scanning direction.

In the present exemplary embodiment, a plurality of divergent light beams emitted from the laser source 1 are collimated by the collimating lens 2, while the aperture diaphragm 3 limits the collimated light beams (the amount of the light of the light beams). Then, the collimated light beams are incident on the cylindrical lens 4 and are output without change in the main-scanning cross section. The light beams converge in the sub-scanning cross section, thereby forming substantially linear images (linear images extending in the main-scanning direction) on the deflecting surface 5*a* of the light deflector 5. The light beams are reflected and deflected by the deflecting surface 5*a* of the light deflector 5, pass through the first and second imaging lenses 61 and 62, and form spot images on the photosensitive drum surface 7. The light deflector 5 is rotated in the direction shown by the arrow A so that the photosensitive drum surface 7 is scanned with the light beams at a constant speed in the direction shown by the arrow B (main-scanning direction). In this manner, an image can be recorded on the photosensitive drum surface 7 that functions as a recording medium.

In the present exemplary embodiment, when the number of light-emitting portions is N, the focal length of the imaging optical system 6 in the sub-scanning direction of the collimating lens 2 is Fcol (mm), the maximum effective image circle of the collimating lens 2 is IS (mm), the imaging magnification of the imaging optical system 6 in the sub-scanning direction is $\beta_{F\theta}$, and the distance between the light beams on the a surface to be scanned 7 in the sub-scanning direction is 25.4/DPI (mm), the following expression can be satisfied:

$$0.18\ (\text{mm}) \leqq (N-1)\times F\text{col}/(IS\times\beta_{F\theta}\times DPI) \leqq 12.0\ (\text{mm}) \quad (1)$$

The maximum image circle IS of the collimating lens 2 refers to the area (diameter) through which the light beams from the light-emitting portions can be condensed and guided to the next optical element with sufficient optical performance. In other words, when the distance between the optical axis and the light-emitting portion farthest from the optical axis is Ymax and the focal length of the collimating lens 2 is f, the maximum image circle IS corresponds to a field angle ω with which the collimating lens 2 satisfies the following equation (1a):

$$Y\text{max}=f\tan\omega \quad \text{(1a)}$$

Conditional Expression (1) shows a condition for providing good aberration correction and/or reduction when the Vertical Cavity Surface Emitting Laser 1 is used and the light beams are focused with a high-definition pitch in the sub-scanning direction. When the value of Conditional Expression (1) is below the lower limit, it can be necessary in some circumstances to increase the arrangement area of the laser source 1 in the main-scanning direction, which can cause jitter in the main-scanning direction. When the value of Conditional Expression (1) is above the upper limit, the high-definition pitch cannot be obtained and the size of the imaging optical system 6 is increased, which leads to an increase in the overall size of the device.

Conditional Expression (1) can also be set as follows:

$$0.24\ (\text{mm}) \leqq (N-1) \times F\text{col}/(IS \times \beta_{F\theta} \times DPI) \leqq 8.78\ (\text{mm}) \quad (2)$$

In addition, in the present exemplary embodiment, when the focal length of the collimating lens 2 is Fcol, the distance between the optical axis and the light-emitting portion farthest from the optical axis in the sub-scanning cross section is $L_0$, the distance between the exit surface of the second imaging lens 62 and the light deflector 5 along the optical axis direction is SI, the imaging magnification of the incident optical system LA in the sub-scanning direction is $\beta_0$, and the F-number of the entrance side of the collimating lens 2 in the sub-scanning cross section is Fno, the following expression can be satisfied:

$$0.10 < |(SI \times /F\text{col} + \beta_0) \times L_0/(SI/(F\text{no} \times \beta_0 \times 2)| 5.43 \quad (3)$$

Conditional Expression (3) shows a condition for providing good aberration correction and/or reduction. When the value of Conditional Expression (3) is below the lower limit, the effects of the aspheric surfaces are not sufficient and the field curvature in the sub-scanning cross section cannot be sufficiently reduced. When the value of Conditional Expression (3) is above the upper limit, the uniformity of distortion (DIST) at each scan image height is degraded and the gap between the light beams in the sub-scanning direction (sub-scan pitch) varies depending on the scan image height.

Conditional Expression (3) can also be set as follows:

$$0.13 < |(SI \times /F\text{col} + \beta_0) \times L_0/(SI/(F\text{no} \times \beta_0 \times 2)| 3.98 \quad (4)$$

Values of Conditional Expressions (1) to (4) according to the present exemplary embodiment are shown in Table 1-2.

TABLE 1-2

| | | | | | | |
|---|---|---|---|---|---|---|
| N | Number of Light-Emitting Units | 4 | 8 | 16 | 24 | 32 |
| IS | Image Circle (Diameter) | 0.090 | 0.210 | 0.450 | 0.690 | 0.930 |
| Lo | Largest Image Height of Light-Emitting Unit | 0.045 | 0.105 | 0.225 | 0.345 | 0.465 |
| Picth_LD | Pitch | 0.030 | 0.030 | 0.030 | 0.030 | 0.030 |
| θ_rot | Laser Rotating Angle | 0 | 0 | 0 | 0 | 0 |
| F_col | Focal Length of Collimating Lens | 20.0 | 20.0 | 20.0 | 20.0 | 20.0 |
| F_cl | Focal Length of Cylindrical Lens | 14.2 | 14.2 | 14.2 | 14.2 | 14.2 |
| β_Fθ | Sub-scan Magnification of Scanning System | 1.02 | 1.02 | 1.02 | 1.02 | 1.02 |
| DPI | Resolution | 1200 | 1200 | 1200 | 1200 | 1200 |
| PICTH | Pitch on Drum | 0.021 | 0.021 | 0.021 | 0.021 | 0.021 |
| Fno | F-number of Collimating Lens | 83.2 | 83.2 | 83.2 | 83.2 | 83.2 |
| Sl | Distance Between Aspherical Surface and Polygon | 100.7 | 100.7 | 100.7 | 100.7 | 100.7 |
| Expressions (1) and (2) | (N − 1) * F_col/(IS * β_Fθ * DPI) | 0.54 | 0.54 | 0.54 | 0.54 | 0.54 |
| Expressions (3) and (4) | (sl/f_col + β_o) * Lo/(Sl/(β_o * Fno * 2)) | 0.29 | 0.69 | 1.47 | 2.25 | 3.03 |

In the present exemplary embodiment, a substantial portion of the Conditional Expressions (1) to (4) are satisfied, as is clear from Table 1-2.

In Table 1-2, the pitch on the surface to be scanned (photosensitive drum surface) in the sub-scanning direction is set to 1200 dpi, and the number of light-emitting portions arranged in the laser source 1 is varied from 4 to 32. The arrangement pitch in the laser source 1 is 30 μm and the arrangement direction is the same as the sub-scanning direction (laser rotational angle is 0°).

In addition, an application example of Table 1-2 is shown in Table 1-3. In Table 1-3, the pitch on the surface to be scanned (photosensitive drum surface) in the sub-scanning direction is set to 2400 dpi, and the number of light-emitting portions arranged in the laser source 1 is varied from 4 to 32. The arrangement pitch in the laser source 1 is 30 μm and the arrangement direction can be rotated around the optical axis by 60° from the sub-scanning direction.

TABLE 1-3

| | | | | | | |
|---|---|---|---|---|---|---|
| N | Number of Light-Emitting Units | 4 | 8 | 16 | 24 | 32 |
| IS | Image Circle (Diameter) | 0.090 | 0.210 | 0.450 | 0.690 | 0.930 |
| Lo | Largest Image Height of Light-Emitting Unit | 0.045 | 0.105 | 0.225 | 0.345 | 0.465 |
| Picth_LD | Pitch | 0.030 | 0.030 | 0.030 | 0.030 | 0.030 |
| θ_rot | Laser Rotating Angle | 60 | 60 | 60 | 60 | 60 |
| F_col | Focal Length of Collimating Lens | 20.0 | 20.0 | 20.0 | 20.0 | 20.0 |
| F_cl | Focal Length of Cylindrical Lens | 14.2 | 14.2 | 14.2 | 14.2 | 14.2 |
| β_Fθ | Sub-scan Magnification of Scanning System | 1.02 | 1.02 | 1.02 | 1.02 | 1.02 |
| DPI | Resolution | 2400 | 2400 | 2400 | 2400 | 2400 |
| PICTH | Pitch on Drum | 0.011 | 0.011 | 0.011 | 0.011 | 0.011 |
| Fno | F-number of Collimating Lens | 83.2 | 83.2 | 83.2 | 83.2 | 83.2 |
| Sl | Distance Between Aspherical Surface and Polygon | 100.7 | 100.7 | 100.7 | 100.7 | 100.7 |
| Expressions (1) and (2) | (N − 1) * F_col/(IS * β_Fθ * DPI) | 0.27 | 0.27 | 0.27 | 0.27 | 0.27 |
| Expressions (3) and (4) | (sl/f_col + β_o) * Lo/(Sl/(β_o * Fno * 2)) | 0.29 | 0.69 | 1.47 | 2.25 | 3.03 |

Also in this example, substantial portions of the Conditional Expressions (1) to (4) are satisfied, as is clear from Table 1-3.

Figure 2:
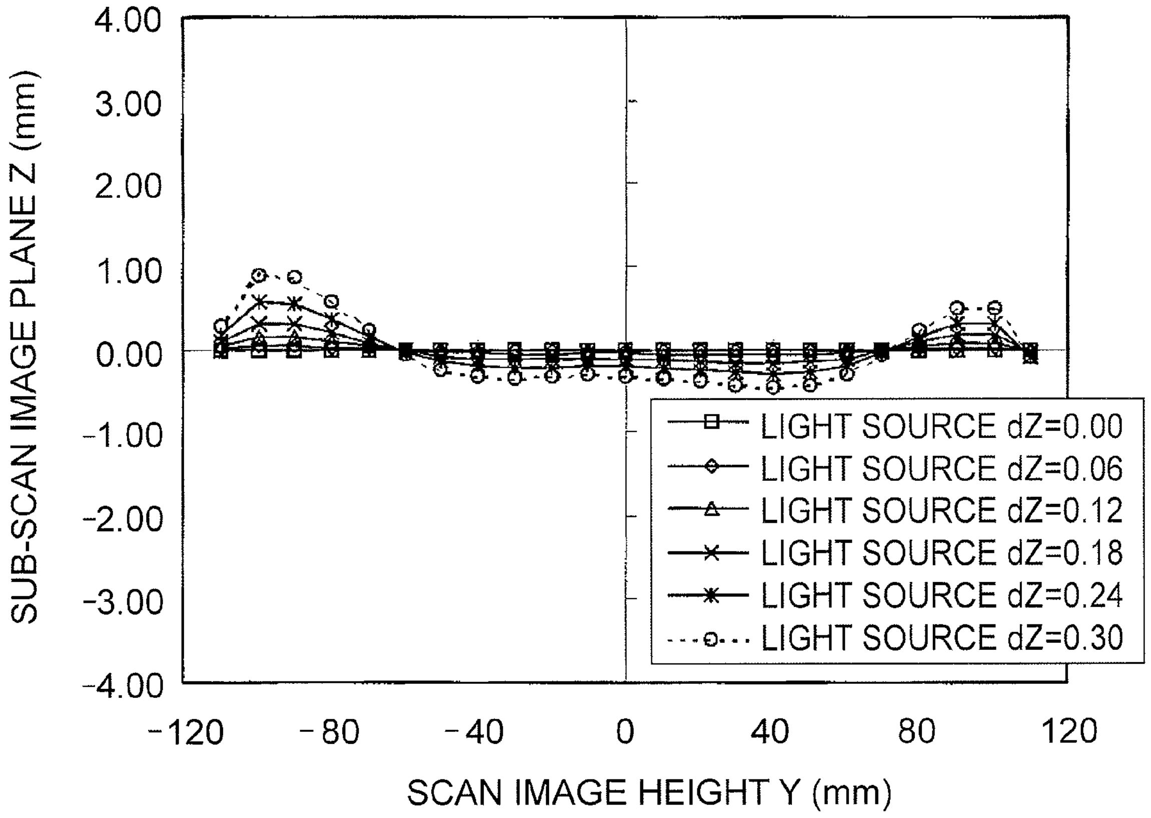
FIG. 2 illustrates a graph of the sub-scan image plane according to the first exemplary embodiment of the present invention.
Figure 3:
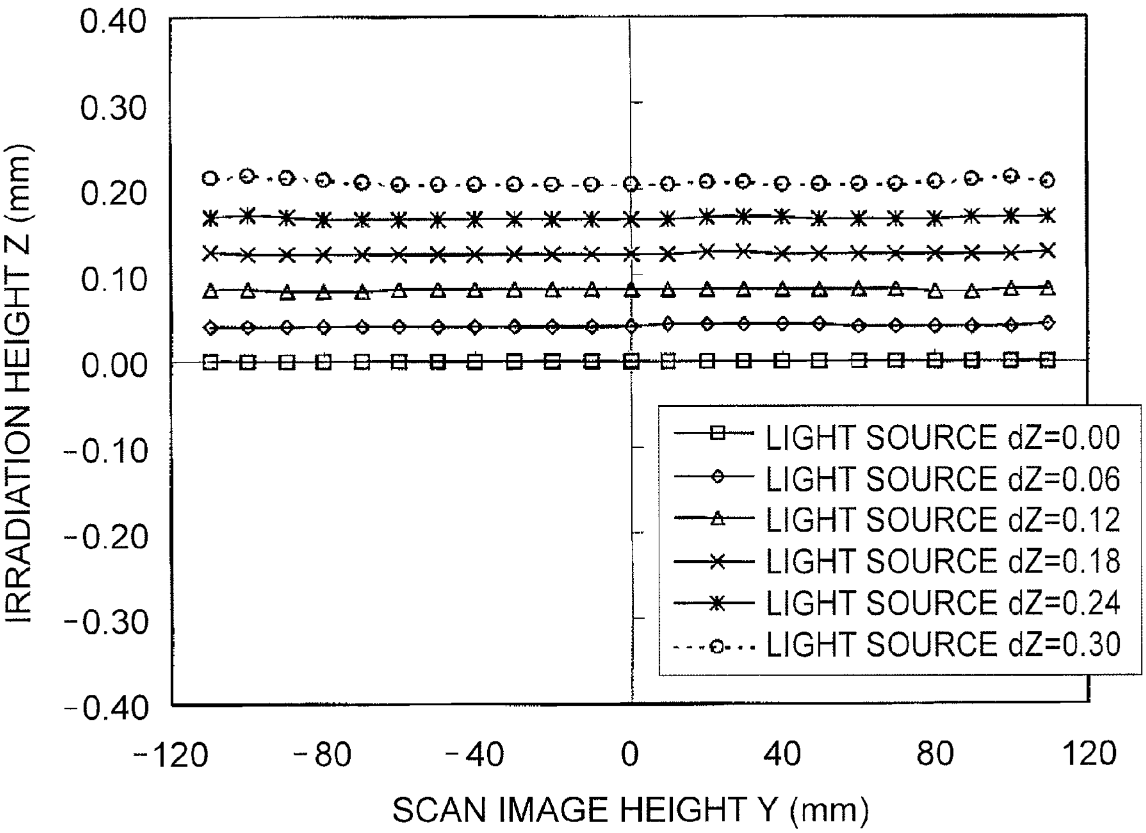
FIG. 3 illustrates a graph of the image-point irradiation height on an image plane in a sub-scanning direction according to the first exemplary embodiment of the present invention.

FIGS. 2 and 3 show aberrations obtained when the laser source 1 has a field angle in the sub-scanning direction.

FIG. 2 illustrates a graph of the paraxial image plane in the sub-scanning direction, where the vertical axis illustrates the paraxial image plane in the sub-scanning direction (sub-scan image plane) and the horizontal axis illustrates the image height (scan image height) on the surface to be scanned in the main-scanning direction. The graph illustrates the case in which the light-emitting portions of the laser source 1 can be arranged such that the field angle is varied with 0.06 mm pitch in the range of Z=0.000 mm to 0.300 mm in terms of the distance from the optical axis of the collimating lens 2 in the sub-scanning direction. As is clear from FIG. 2, unlike the graph shown in FIG. 21 according to the conventional structure shown, the sub-scan image plane barely varies (the field curvature does not easily occur) even when the sub-scan field angle of the light-emitting portion is increased.

Figure 21:
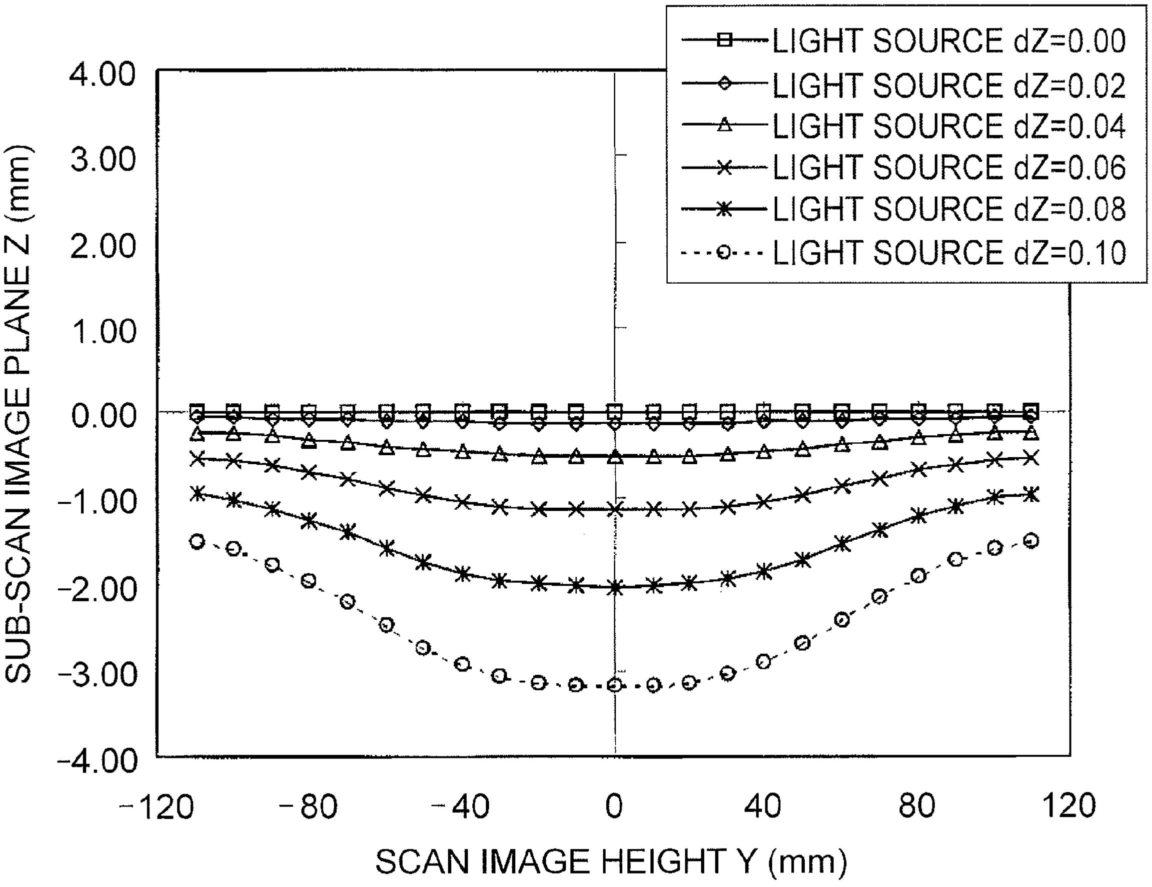
FIG. 21 illustrates a graph of the sub-scan image plane according to a conventional structure.

In the conventional structure, the field curvature in the sub-scanning direction shown in FIG. 21 is obtained as the sum of the field curvatures in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, a desirable image plane can be obtained as illustrated in FIG. 2 since the variation directions of the field curvatures caused by the incident optical system LA and the imaging optical system 6 in the sub-scanning direction due to the variation in the field angle in the sub-scanning direction are opposite to each other. In other words, the field curvatures can cancel each other.

FIG. 3 illustrates a graph of the irradiation height of the image point on the surface to be scanned in the sub-scanning direction, where the vertical axis illustrates the irradiation height of the image point in the sub-scanning direction and the horizontal axis illustrates the image height on the surface to be scanned in the main-scanning direction (scan image height). The graph illustrates the case in which the light-emitting portions of the laser source 1 can be arranged such that the field angle is varied with 0.06 mm pitch in the range of Z=0.000 mm to 0.300 mm in terms of the distance from the optical axis of the collimating lens 2 in the sub-scanning direction.

Figure 22:
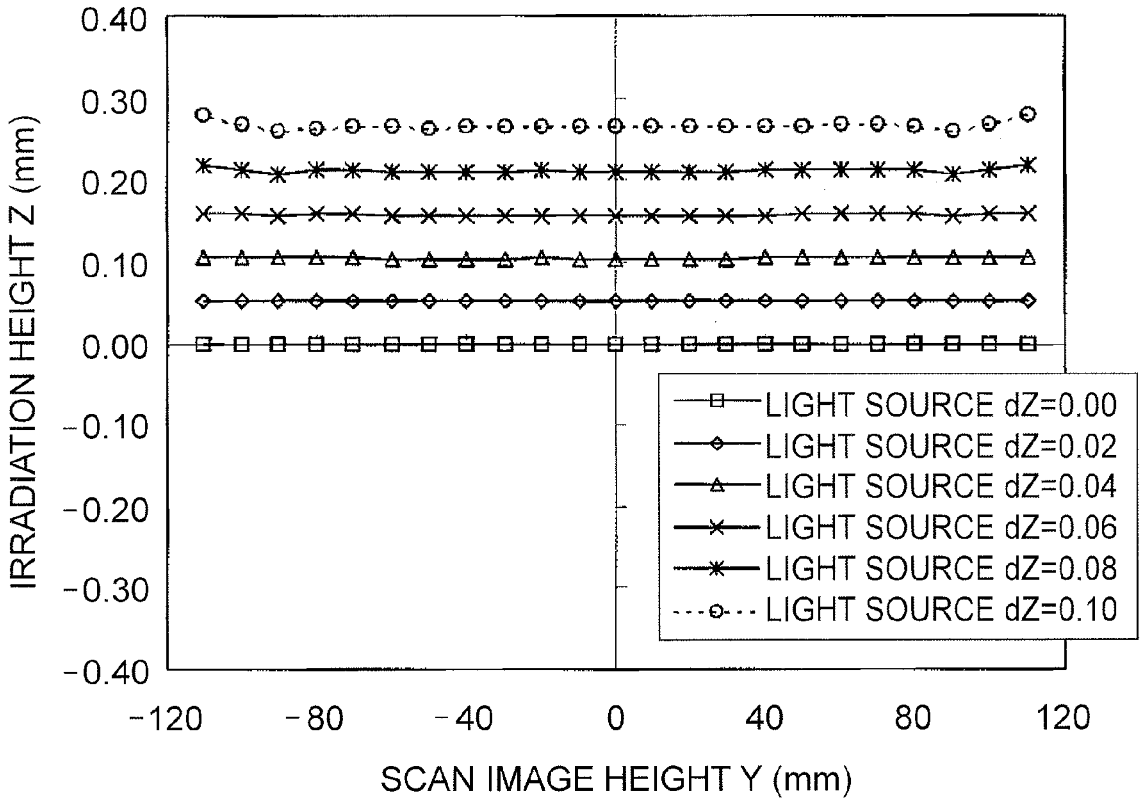
FIG. 22 illustrates a graph of the image-point irradiation height on an image plane in a sub-scanning direction according to the conventional structure.

As is clear from FIG. 3, unlike the graph shown in FIG. 22 according to the conventional structure, the gap between the beams in the sub-scanning direction (sub-scan pitch) barely varies depending on the main-scan image height even when the sub-scan field angle of the light-emitting portion is increased. Although the amount of variation in the sub-san pitch is large in the regions where the scan image height is large in the graph shown in FIG. 22, the pitch is uniform in the present exemplary embodiment. In other words, the distortion (DIST) in the sub-scanning direction is corrected or error reduced in the present exemplary embodiment.

In the conventional structure, the distortion (DIST) in the sub-scanning direction shown in FIG. 22 is obtained as the sum of the distortions (DIST) in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, desirable scan lines with uniform image-point irradiation height can be obtained as illustrated in FIG. 3 since the variation directions of the distortions (DIST) caused by the incident optical system LA and the imaging optical system 6 in the sub-scanning direction due to the variation in the field angle in the sub-scanning direction are opposite to each other. In other words, the distortions (DIST) cancel each other.

Figure 4:
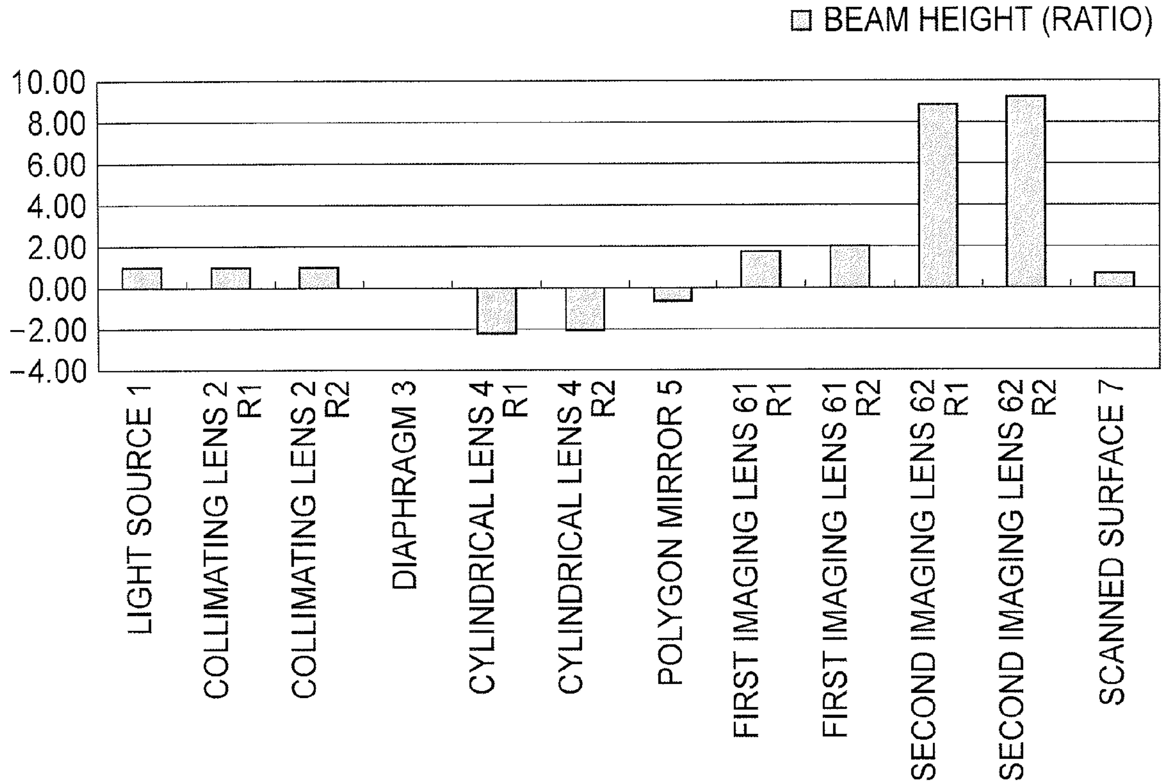
FIG. 4 illustrates a graph of the beam height in each surface according to the first exemplary embodiment of the present invention.

FIG. 4 illustrates a graph showing the positions in the sub-scanning direction at which the principal ray of the light beam emitted from the light-emitting portion farthest from the optical axis in the sub-scanning cross section passes through the optical elements. The distances from the optical axis are normalized such that the distance between the optical axis and the light-emitting portion farthest therefrom equals 1.

As illustrated in FIG. 4, the beam is farthest from the optical axis when the beam passes through the second imaging lens 62, and accordingly the shape of the exit surface of the second imaging lens 62 is aspherical in the sub-scanning cross section.

Accordingly, in the present exemplary embodiment, the aberrations including the field curvature and the distortion (DIST) in the sub-scanning cross section are reliably corrected and/or reduced.

In the present exemplary embodiment, the imaging optical system 6 includes two lenses. However, the present invention is not limited to this, and the imaging optical system 6 can also be formed of a single lens or three or more lenses. In addition, a diffractive optical element can also be included in the imaging optical system 6. In addition, the material of the optical elements included in the imaging optical system 6 is not limited to plastic, and glass, for example, can also be used.

Second Exemplary Embodiment

Figure 5:
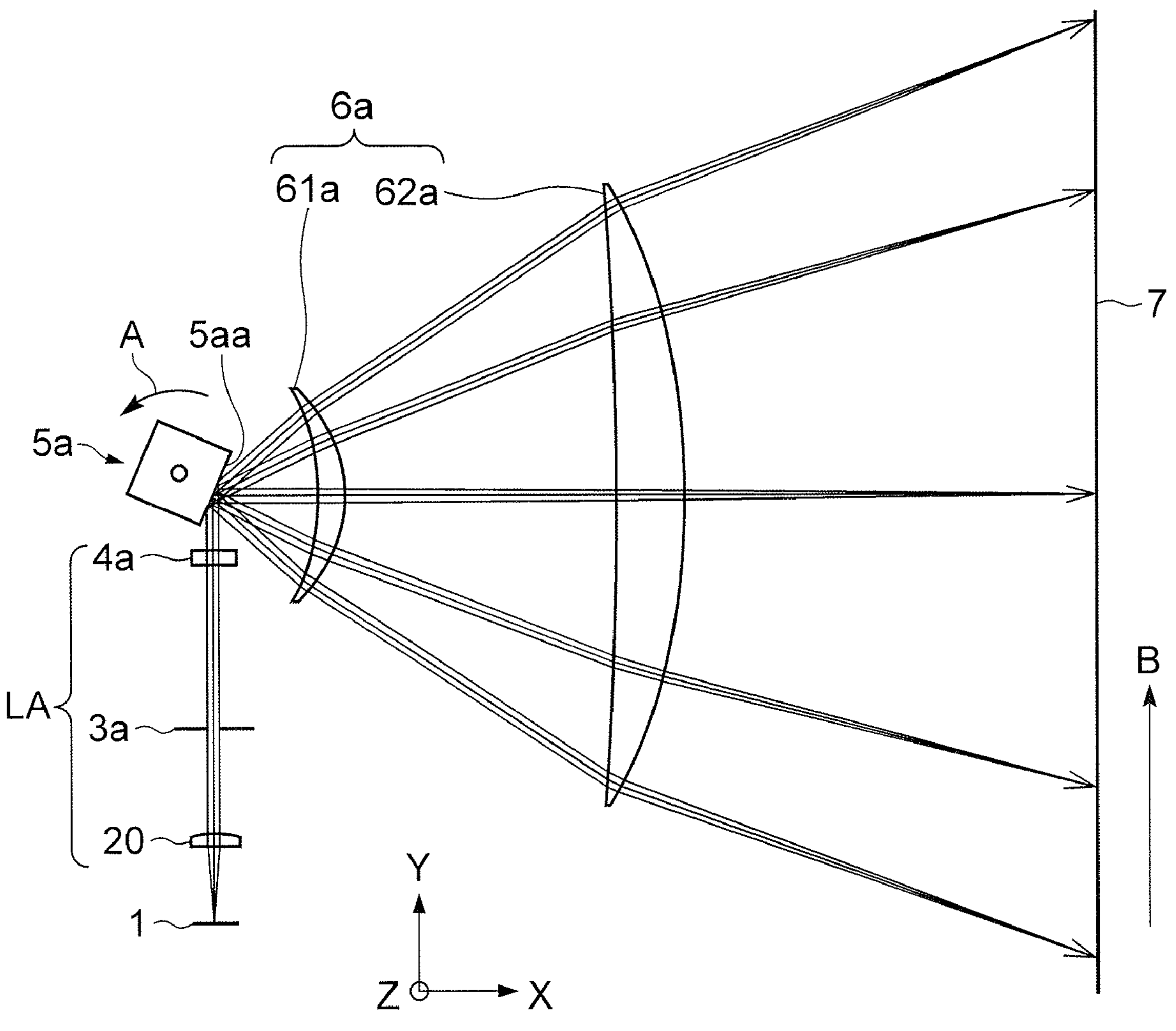
FIG. 5 illustrates a main-scanning cross section according to a second exemplary embodiment of the present invention.

FIG. 5 illustrates a cross section of the main part of an optical scanning apparatus according to a second exemplary embodiment of the present invention taken along a main-scanning direction (main-scanning cross section). In FIG. 5, components similar to those shown in FIGS. 1A and 1B are denoted by the same reference numerals with an "a" after the reference numeral to indicate that some of the actual optical characteristics can be different.

The present exemplary embodiment differs from the above-described first exemplary embodiment in that a collimating lens 20 has an aspherical exit surface. Other structures and the optical operation according to the present exemplary embodiment can be similar to those of the first exemplary embodiment, and effects related to those of the first exemplary embodiment can also be obtained in the present exemplary embodiment.

Referring to FIG. 5, the collimating lens (condenser lens) 20, which can have the aspherical exit surface, can function as a light-condensing unit and converts the light beams emitted from the light source 1 into substantially collimated light beams. In the present exemplary embodiment, the light beams can substantially overlap each other in a region near the diaphragm 3 irrespective of the field angle in the sub-scanning direction and the exit surface of the collimating lens 20 that faces the diaphragm 3 has a non-arc shape in the sub-scanning cross section. Accordingly, the effect of the aspheric surface similar to that described above is obtained. Thus, according to the present exemplary embodiment, the wave aberration can be reliably corrected even when the light beams have a field angle in the sub-scanning direction.

In the present exemplary embodiment, the lens surface through which the light beams pass at positions near each other is aspherical in the sub-scanning cross section. Therefore, the coma aberration can be reliably corrected and/or reduced for each of the light beams.

Table 2-1 shows data of the optical scanning apparatus according to the present exemplary embodiment. Expressions used in Table 2-1 are related to those used in the first exemplary embodiment. In addition, values of Conditional Expressions (1) to (4) according to the present exemplary embodiment are shown in Table 2-2.

TABLE 2-1

| | Surface No. | Curvature (Main) | Curvature (Sub) | Surface Gap | Refractive Index |
|---|---|---|---|---|---|
| Light Source 1 | 0 | | | 18.245 | |
| Collimating Lens 20 R1 | 1 | ∞ | ∞ | 3.000 | 1.762 |
| Collimating Lens 20 R2 | 2 | Aspherical (see below) | Aspherical (see below) | 24.123 | |
| Diaphragm 3a | 3 | ∞ | ∞ | 38.748 | |
| Cylindrical Lens 4a R1 | 4 | ∞ | 10.8 | 3.000 | 1.762 |
| Cylindrical Lens 4a R2 | 5 | ∞ | ∞ | 12.800 | |
| Polygon Mirror 5a | 6 | ∞ | ∞ | 24.200 | |
| First Imaging Lens 61a R1 | 7 | Aspherical (see below) | Aspherical (see below) | 6.000 | 1.524 |
| First Imaging Lens 61a R2 | 8 | Aspherical (see below) | Aspherical (see below) | 63.327 | |
| Second Imaging Lens 62a R1 | 9 | Aspherical (see below) | Aspherical (see below) | 15.503 | 1.524 |
| Second Imaging Lens 62a R2 | 10 | Aspherical (see below) | Aspherical (see below) | 96.942 | |
| A surface to be scanned 7 | 11 | | | | |

| | |
|---|---|
| Fθ Coefficient | 150.0 |
| Sub-scan Magnification of Fθ Lens | 1.04 |
| Focal Length of Collimating Lens 2 | 20.0 |
| Focal Length of Cylindrical Lens 4 | 14.2 |
| Shape of Diaphragm | Elliptical Main: 3.20 * Sub: 0.20 |
| Deflector | Circumcircle ϕ20/Four Reflecting Surfaces |

| Meridional Line (Upper) | | Meridional Line (Lower) | | Sagittal Line (Upper) | | Sagittal Line (Lower) | |
|---|---|---|---|---|---|---|---|
| **Seventh Surface Expression A** | | | | | | | |
| R | −5.44E+01 | | | r | | ∞ | |
| Ku | 2.47E+00 | Kl | 2.47E+00 | D2u | 0.00E+00 | D2l | 0.00E+00 |
| B4u | 5.99E−06 | B4l | 5.99E−06 | D4u | 0.00E+00 | D4l | 0.00E+00 |
| B6u | −6.70E−09 | B6l | −6.70E−09 | D6u | 0.00E+00 | D6l | 0.00E+00 |
| B8u | 4.61E−12 | B8l | 4.61E−12 | D8u | 0.00E+00 | D8l | 0.00E+00 |
| B10u | 4.11E−15 | B10l | 4.11E−15 | D10u | 0.00E+00 | D10l | 0.00E+00 |
| **Eighth Surface Expression A** | | | | | | | |
| R | −3.61E+01 | | | r | | ∞ | |
| Ku | −7.54E−01 | Kl | −7.54E−01 | D2u | 0.00E+00 | D2l | 0.00E+00 |
| B4u | 1.02E−07 | B4l | 7.55E−07 | D4u | 0.00E+00 | D4l | 0.00E+00 |
| B6u | 2.67E−09 | B6l | −2.04E−10 | D6u | 0.00E+00 | D6l | 0.00E+00 |
| B8u | −1.53E−11 | B8l | −9.28E−12 | D8u | 0.00E+00 | D8l | 0.00E+00 |
| B10u | 1.18E−14 | B10l | 7.23E−15 | D10u | 0.00E+00 | D10l | 0.00E+00 |
| **Ninth Surface Expression A** | | | | | | | |
| R | −1.05E+03 | | | r | | 1.84E+03 | |
| Ku | 0.00E+00 | Kl | 0.00E+00 | D2u | −1.90E−05 | D2l | −1.09E−05 |
| B4u | 0.00E+00 | B4l | 0.00E+00 | D4u | −2.12E−08 | D4l | −2.12E−08 |
| B6u | 0.00E+00 | B6l | 0.00E+00 | D6u | 0.00E+00 | D6l | 0.00E+00 |
| B8u | 0.00E+00 | B8l | 0.00E+00 | D8u | 0.00E+00 | D8l | 0.00E+00 |
| B10u | 0.00E+00 | B10l | 0.00E+00 | D10u | 0.00E+00 | D10l | 0.00E+00 |
| **Tenth Surface Expression B** | | | | | | | |
| R | −1.99E+02 | | | | | | |
| Ku | −5.28E+01 | Kl | −4.28E+01 | | | | |
| B4u | −6.07E−07 | B4l | −6.07E−07 | | | | |
| B6u | 7.12E−11 | B6l | 7.12E−11 | | | | |
| B8u | −4.74E−15 | B8l | −4.74E−15 | | | | |
| B10u | 0.00E+00 | B10l | 0.00E+00 | | | | |
| E02 | −1.89E−02 | | | | | | |
| E12 | 9.28E−07 | | | | | | |
| E04 | 0.00E+00 | | | | | | |
| E22 | 5.45E−07 | | | | | | |
| E14 | 0.00E+00 | | | | | | |

TABLE 2-1-continued

| | |
|---|---|
| E32 | 3.46E−10 |
| E24 | 0.00E+00 |
| E42 | −1.06E−10 |
| E52 | −5.97E−14 |
| E44 | 0.00E+00 |
| E62 | 2.52E−15 |
| E64 | 0.00E+00 |
| E82 | 1.33E−18 |

Second Surface Expression A

| | | | | | | | |
|---|---|---|---|---|---|---|---|
| R | | −1.52E+01 | | r | | −1.52E+01 | |
| Ku | 0.00E+00 | Kl | 0.00E+00 | D2u | 0.00E+00 | D2l | 0.00E+00 |
| B4u | 3.00E−05 | B4l | 3.00E−05 | D4u | 3.00E−05 | D4l | 3.00E−05 |
| B6u | 0.00E+00 | B6l | 0.00E+00 | D6u | 0.00E+00 | D6l | 0.00E+00 |
| B8u | 0.00E+00 | B8l | 0.00E+00 | D8u | 0.00E+00 | D8l | 0.00E+00 |
| B10u | 0.00E+00 | B10l | 0.00E+00 | D10u | 0.00E+00 | D10l | 0.00E+00 |

TABLE 2-2

| | | | | | | |
|---|---|---|---|---|---|---|
| N | Number of Light-Emitting Units | 4 | 8 | 16 | 24 | 32 |
| IS | Image Circle (Diameter) | 0.090 | 0.210 | 0.450 | 0.690 | 0.930 |
| Lo | Largest Image Height of Light-Emitting Unit | 0.045 | 0.105 | 0.225 | 0.345 | 0.465 |
| Picth_LD | Pitch | 0.030 | 0.030 | 0.030 | 0.030 | 0.030 |
| θ_rot | Laser Rotating Angle | 0 | 0 | 0 | 0 | 0 |
| F_col | Focal Length of Collimating Lens | 20.0 | 20.0 | 20.0 | 20.0 | 20.0 |
| F_cl | Focal Length of Cylindrical Lens | 14.2 | 14.2 | 14.2 | 14.2 | 14.2 |
| β_Fθ | Sub-scan Magnification of Scanning System | 1.04 | 1.04 | 1.04 | 1.04 | 1.04 |
| DPI | Resolution | 1200 | 1200 | 1200 | 1200 | 1200 |
| PICTH | Pitch on Drum | 0.021 | 0.021 | 0.021 | 0.021 | 0.021 |
| Fno | F-number of Collimating Lens | 99.9 | 99.9 | 99.9 | 99.9 | 99.9 |
| Sl | Distance Between Aspherical Surface and Polygon | 109.0 | 109.0 | 109.0 | 109.0 | 109.0 |
| Expressions (1) and (2) | (N − 1) * F_col/(IS * β_Fθ * DPI) | 0.54 | 0.54 | 0.54 | 0.54 | 0.54 |
| Expressions (3) and (4) | (sl/f_col + β_o) * Lo/(Sl/(β_o * Fno * 2)) | 0.35 | 0.82 | 1.75 | 2.68 | 3.62 |

The maximum image circle IS of the collimating lens 20 refers to the area (diameter) through which the light beams from the light-emitting portions can be condensed and guided to the next optical element with sufficient optical performance. In other words, when the distance between the optical axis and the light-emitting portion farthest from the optical axis is Ymax and the focal length of the collimating lens 20 is f, the maximum image circle IS corresponds to a field angle ω with which the collimating lens 20 satisfies the following equation (1b):

$$Ymax=f\tan\omega \qquad (1b)$$

In the present exemplary embodiment, a substantial portion of the Conditional Expressions (1) to (4) are satisfied, as is clear from Table 2-2.

In Table 2-2, the pitch on the surface to be scanned (photosensitive drum surface) in the sub-scanning direction is set to 1200 dpi, and the number of light-emitting portions arranged in the laser source 1 is varied from 4 to 32. The arrangement pitch in the laser source 1 is 30 μm and the arrangement direction is the same as the sub-scanning direction (laser rotational angle is 0°).

Figure 6:
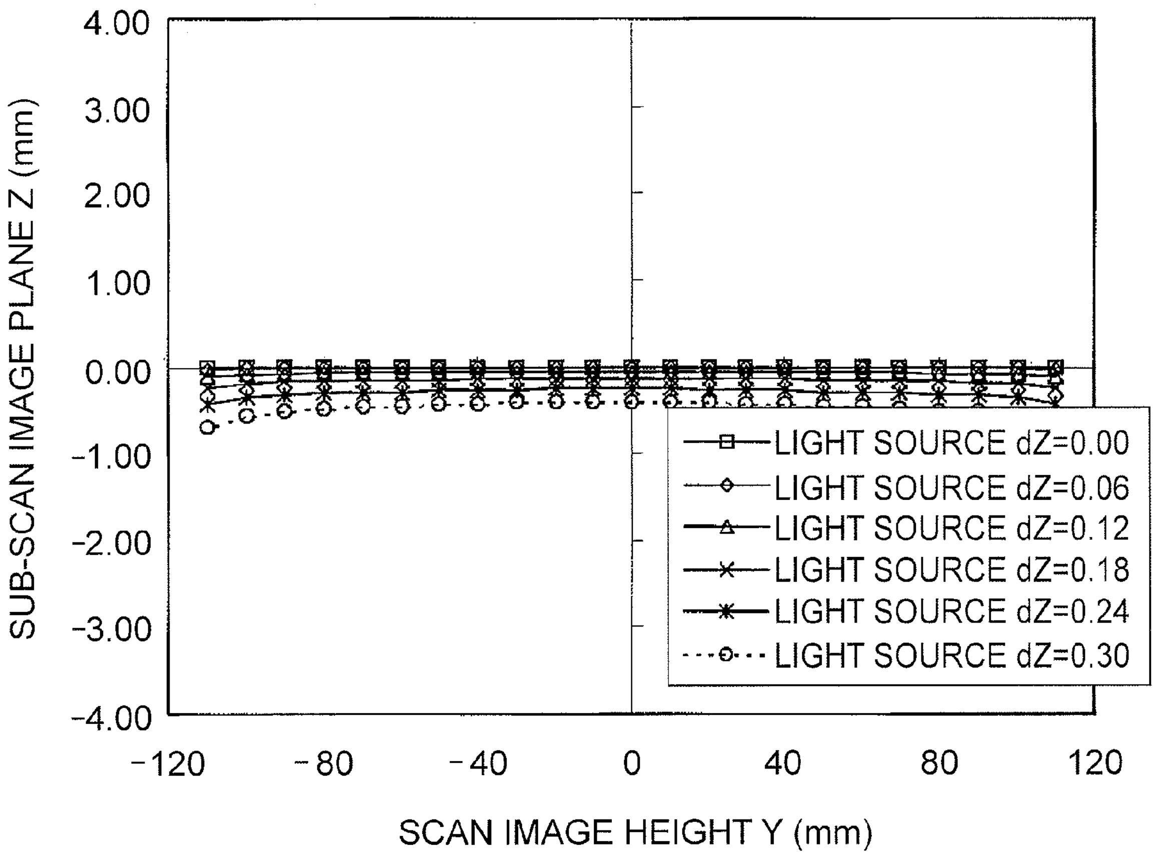
FIG. 6 illustrates a graph of the sub-scan image plane according to the second exemplary embodiment of the present invention.
Figure 7:
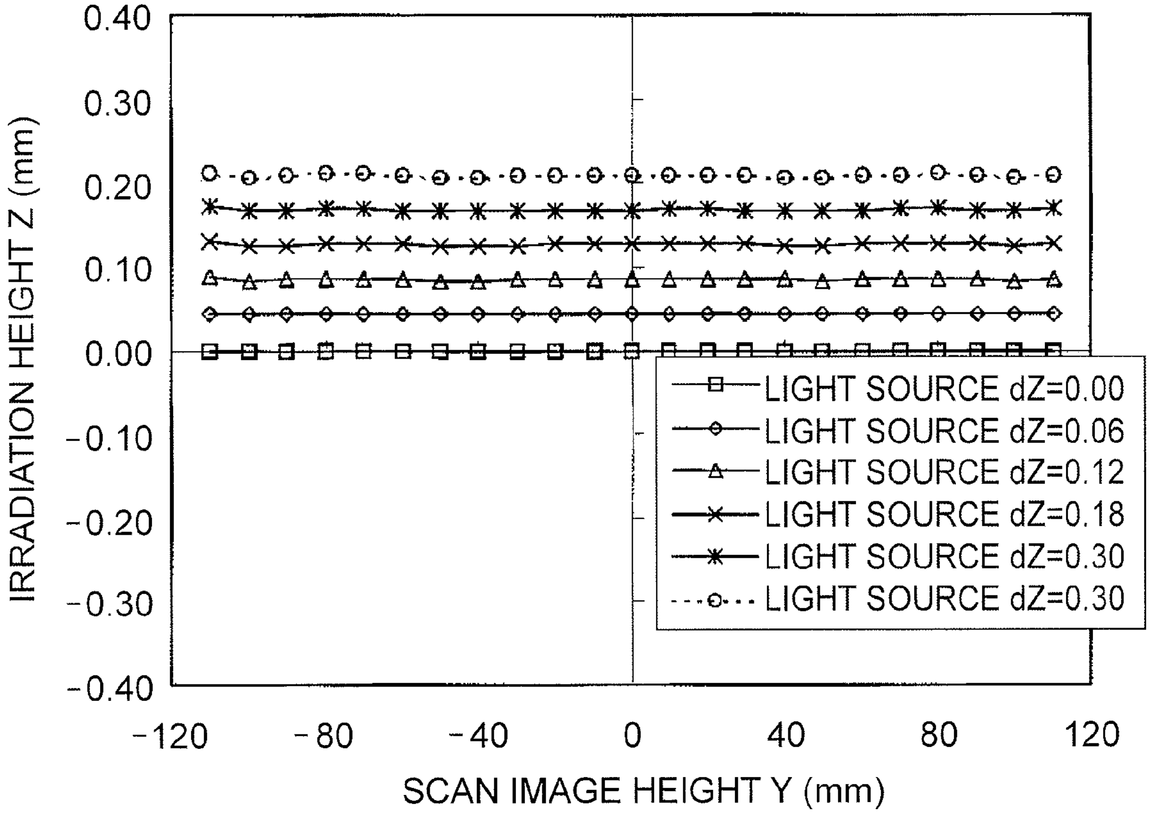
FIG. 7 illustrates a graph of the image-point irradiation height on an image plane in a sub-scanning direction according to the second exemplary embodiment of the present invention.

FIGS. 6 and 7 show aberrations obtained when the laser source 1 has a field angle in the sub-scanning direction.

FIG. 6 illustrates a graph of the paraxial image plane in the sub-scanning direction, where the vertical axis illustrates the paraxial image plane in the sub-scanning direction (sub-scan image plane) and the horizontal axis illustrates the image height (scan image height) on a surface to be scanned in the main-scanning direction. The graph illustrates the case in which the light-emitting portions of the laser source 1 can be arranged such that the field angle is varied with 0.06 mm pitch in the range of Z=0.000 mm to 0.300 mm in terms of the distance from the optical axis of the collimating lens 20 in the sub-scanning direction. As is clear from FIG. 6, unlike the graph shown in FIG. 21 according to the conventional structure shown, the sub-scan image plane barely varies (the field curvature does not easily occur) even when the sub-scan field angle of the light-emitting portion is increased.

In the conventional structure, the field curvature in the sub-scanning direction shown in FIG. 21 is obtained as the sum of the field curvatures in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, a desirable image plane can be obtained as illustrated in FIG. 6 since the variation directions of the field curvatures caused by the incident optical system LA and the imaging optical system 6 in the sub-scanning direction due to the variation in the field angle in the sub-scanning direction are opposite to each other. In other words, the field curvatures effectively cancel or reduce each other.

FIG. 7 illustrates a graph of the irradiation height of the image point on a surface to be scanned in the sub-scanning direction, where the vertical axis illustrates the irradiation height of the image point in the sub-scanning direction and the horizontal axis illustrates the image height on a surface to be scanned in the main-scanning direction (scan image height). The graph illustrates the case in which the light-emitting portions of the laser source 1*a* can be arranged such that the field angle is varied with 0.06 mm pitch in the range of Z=0.000 mm to 0.300 mm in terms of the distance from the optical axis of the collimating lens 20 in the sub-scanning direction.

As is clear from FIG. 7, unlike the graph shown in FIG. 22 according to the conventional structure, the gap between the beams in the sub-scanning direction (sub-scan pitch) barely varies depending on the main-scan image height even when the sub-scan field angle of the light-emitting portion is increased. Although the amount of variation in the sub-san pitch is large in the regions where the scan image height is large in the graph shown in FIG. 22, the pitch is uniform in the present exemplary embodiment. In other words, the distortion (DIST) in the sub-scanning direction is corrected or error reduced in the present exemplary embodiment.

In the conventional structure, the distortion (DIST) in the sub-scanning direction shown in FIG. 22 is obtained as the sum of the distortions (DIST) in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, desirable scan lines with uniform image-point irradiation height can be obtained as illustrated in FIG. 7 since the variation directions of the distortions (DIST) caused by the incident optical system LA and the imaging optical system 6*a* in the sub-scanning direction due to the variation in the field angle in the sub-scanning direction are opposite to each other. In other words, the distortions (DIST) cancel each other.

Figure 8:
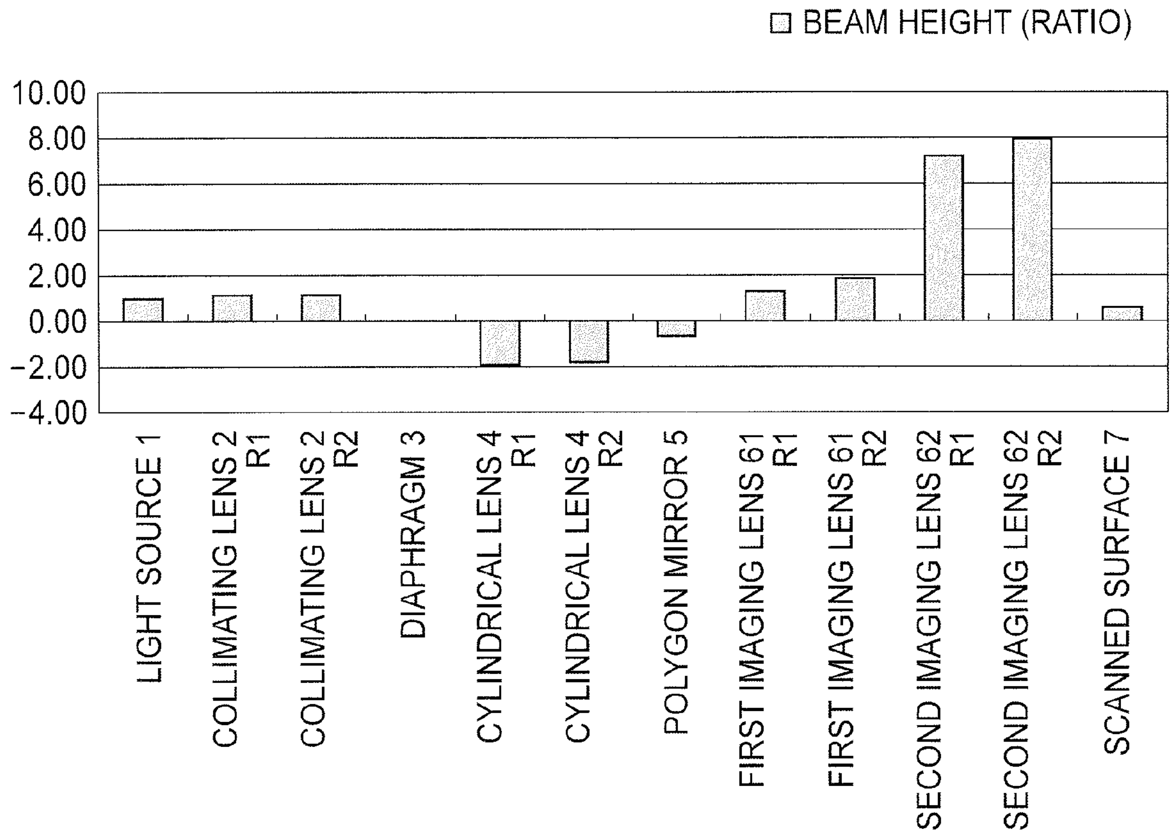
FIG. 8 illustrates a graph of the beam height in each surface according to the second exemplary embodiment of the present invention.

FIG. 8 illustrates a graph showing the positions in the sub-scanning direction at which the principal ray of the light beam emitted from the light-emitting portion farthest from the optical axis in the sub-scanning cross section passes through the optical elements. The distances from the optical axis are normalized such that the distance between the optical axis and the light-emitting portion farthest therefrom equals 1.

As illustrated in FIG. 8, the beam is farthest from the optical axis when the beam passes through the second imaging lens 62*a*, and accordingly the shape of the exit surface of the second imaging lens 62*a* is aspherical in the sub-scanning cross section.

Third Exemplary Embodiment

Next, an optical scanning apparatus according to a third exemplary embodiment will be described below. The structure of the optical system is related to that shown in FIGS. 1A and 1B and thus discussion of the third exemplary embodiment will refer to the same reference numerals as in FIGS. 1A and 1B but with different properties, as discussed below.

The present exemplary embodiment differs from the above-described first exemplary embodiment in that the second imaging lens 62 formed of the anamorphic lens has an entrance surface expressed by Expression B and an aspherical exit surface expressed by Expression A. Other structures and the optical operation according to the present exemplary embodiment are related to those of the first exemplary embodiment, and effects related to those of the first exemplary embodiment can also be obtained in the present exemplary embodiment.

According to the present exemplary embodiment, the entrance surface of the second imaging lens 62 is expressed by Expression B and the exit surface of the second imaging lens 62 is aspherical and is expressed by Expression A. The entrance surface of the second imaging lens 62 has a non-arc shape in the sub-scanning cross section.

Table 3-1 shows data of the optical scanning apparatus according to the present exemplary embodiment. Expressions used in Table 3-1 are related to those used in the first exemplary embodiment.

TABLE 3-1

| | Surface No. | Curvature (Main) | Curvature (Sub) | Surface Gap | Refractive Index |
|---|---|---|---|---|---|
| Light Source 1 | 0 | | | 18.245 | |
| Collimating Lens 2 R1 | 1 | ∞ | ∞ | 3.000 | 1.762 |
| Collimating Lens 2 R2 | 2 | −15.216 | −15.216 | 19.982 | |
| Diaphragm 3 | 3 | ∞ | ∞ | 42.880 | |
| Cylindrical Lens 4 R1 | 4 | ∞ | 10.8 | 3.000 | 1.762 |
| Cylindrical Lens 4 R2 | 5 | ∞ | ∞ | 12.800 | |
| Polygon Mirror 5 | 6 | ∞ | ∞ | 24.200 | |
| First Imaging Lens 61 R1 | 7 | Aspherical (see below) | Aspherical (see below) | 6.000 | 1.524 |
| First Imaging Lens 61 R2 | 8 | Aspherical (see below) | Aspherical (see below) | 65.500 | |
| Second Imaging Lens 62 R1 | 9 | Aspherical (see below) | Aspherical (see below) | 5.000 | 1.524 |
| Second Imaging Lens 62 R2 | 10 | Aspherical (see below) | Aspherical (see below) | 83.559 | |
| A surface to be scanned 7 | 11 | | | | |

| | |
|---|---|
| Fθ Coefficient | 150.0 |
| Sub-scan Magnification of Fθ Lens | 0.98 |
| Focal Length of Collimating Lens 2 | 20.0 |
| Focal Length of Cylindrical Lens 4 | 14.2 |
| Shape of Diaphragm | Elliptical Main: 3.20 * Sub: 0.24 |
| Deflector | Circumcircle φ20/Four Reflecting Surfaces |

| Meridional Line (Upper) | Meridional Line (Lower) | Sagittal Line (Upper) | Sagittal Line (Lower) |
|---|---|---|---|

TABLE 3-1-continued

| | | | | | | | |
|---|---|---|---|---|---|---|---|
| | | | Seventh Surface Expression A | | | | |
| R | | −5.60E+01 | | r | | ∞ | |
| Ku | 2.61E+00 | Kl | 2.61E+00 | D2u | 0.00E+00 | D2l | 0.00E+00 |
| B4u | 3.73E−06 | B4l | 3.73E−06 | D4u | 0.00E+00 | D4l | 0.00E+00 |
| B6u | −5.67E−09 | B6l | −5.67E−09 | D6u | 0.00E+00 | D6l | 0.00E+00 |
| B8u | 4.67E−12 | B8l | 4.67E−12 | D8u | 0.00E+00 | D8l | 0.00E+00 |
| B10u | 2.81E−15 | B10l | 2.81E−15 | D10u | 0.00E+00 | D10l | 0.00E+00 |
| | | | Eighth Surface Expression A | | | | |
| R | | −3.31E+01 | | r | | ∞ | |
| Ku | −2.34E−01 | Kl | −2.34E−01 | D2u | 0.00E+00 | D2l | 0.00E+00 |
| B4u | 8.94E−07 | B4l | 1.45E−06 | D4u | 0.00E+00 | D4l | 0.00E+00 |
| B6u | 1.23E−09 | B6l | −9.96E−10 | D6u | 0.00E+00 | D6l | 0.00E+00 |
| B8u | −1.17E−11 | B8l | −7.29E−12 | D8u | 0.00E+00 | D8l | 0.00E+00 |
| B10u | 9.30E−15 | B10l | 5.82E−15 | D10u | 0.00E+00 | D10l | 0.00E+00 |
| | | | Ninth Surface Expression B | | | | |
| R | | −1.40E+02 | | | | | |
| Ku | 0.00E+00 | Kl | 0.00E+00 | | | | |
| B4u | 0.00E+00 | B4l | 0.00E+00 | | | | |
| B6u | 0.00E+00 | B6l | 0.00E+00 | | | | |
| B8u | 0.00E+00 | B8l | 0.00E+00 | | | | |
| B10u | 0.00E+00 | B10l | 0.00E+00 | | | | |
| E02 | −7.51E−03 | | | | | | |
| E12 | −1.62E−06 | | | | | | |
| E04 | −2.56E−05 | | | | | | |
| E22 | −5.03E−09 | | | | | | |
| E14 | 6.10E−09 | | | | | | |
| E32 | −2.54E−10 | | | | | | |
| E24 | 5.36E−09 | | | | | | |
| E42 | 6.44E−10 | | | | | | |
| E52 | 1.56E−13 | | | | | | |
| E44 | −1.57E−12 | | | | | | |
| E62 | −1.36E−13 | | | | | | |
| E64 | 3.53E−16 | | | | | | |
| E82 | 7.81E−18 | | | | | | |
| | | | Tenth Surface Expression A | | | | |
| R | | −1.65E+02 | | r | | −1.79E+01 | |
| Ku | −3.77E+01 | Kl | −3.77E+01 | D2u | 4.93E−05 | D2l | 4.93E−05 |
| B4u | −1.07E−06 | B4l | −1.07E−06 | D4u | 9.08E−09 | D4l | 9.08E−09 |
| B6u | 1.46E−10 | B6l | 1.46E−10 | D6u | 0.00E+00 | D6l | 0.00E+00 |
| B8u | −1.60E−14 | B8l | −1.60E−14 | D8u | 0.00E+00 | D8l | 0.00E+00 |
| B10u | 0.00E+00 | B10l | 0.00E+00 | D10u | 0.00E+00 | D10l | 0.00E+00 |

The structure of the imaging optical system 6 and the optical operation thereof will be described below.

The imaging optical system includes first and second imaging lenses 61 and 62 (e.g., made of resin) and causes the light beams reflected and deflected by the light deflector 5 to form an image on the surface to be scanned 7. Accordingly, beam spots are formed and the surface to be scanned 7 is scanned at a constant speed.

The first and second imaging lenses 61 and 62 (e.g., made of resin) can be manufactured by a conventional molding process in which resin is injected into a mold and is taken out from the mold after being cooled. Accordingly, if the imaging lenses 61 and 62 are manufactured by molding then they can be easily manufactured with low cost compared to conventional imaging lenses made of glass.

The first imaging lens 61 can have a positive power mainly in the main-scanning direction as illustrated in Table 3-1, and can have an aspherical lens surfaces with shapes expressed by Equations (a) to (d). The first imaging lens 61 according to the present exemplary embodiment has a higher power in the main-scanning cross section (main-scanning direction) than in the sub-scanning cross section (sub-scanning direction). In the main-scanning cross section, the first imaging lens 61 has a meniscus shape and the entrance surface thereof is non-arc and concave toward the light deflector 5. In the sub-scanning cross section, the first imaging lens 61 has a cylindrical shape in which both the entrance and exit surfaces are flat in the sub-scanning direction. However, it is not necessary that the entrance and exit surfaces be completely flat, as describe in the first exemplary embodiment.

The first imaging lens 61 focuses the light beams incident thereon mainly in the main-scanning direction.

The second imaging lens 62 is an anamorphic lens having different powers in the main-scanning direction and the sub-scanning direction, as illustrated in Table 3-1.

The present exemplary embodiment differs from the above-described first exemplary embodiment in that the entrance and exit surfaces of the second imaging lens 62 are aspherical and are expressed by Expressions B and A, respectively. The entrance surface has a non-arc shape in the sub-scanning cross section.

The second imaging lens 62 has a higher power in the sub-scanning cross section than in the main-scanning cross section. In the main-scanning cross section, the entrance surface of the second imaging lens 62 has an arc shape and the exit surface thereof has a non-arc shape. In the sub-scanning cross section, the entrance surface of the second imaging lens 62 has a non-arc shape and the exit surface thereof has an arc shape.

The second imaging lens 62 can have a lens shape that is asymmetric with respect to the optical axis in the main-scanning cross section, and has substantially no power in the main-scanning direction in a region around the optical axis. In the sub-scanning cross section, the entrance surface of the second imaging lens 62 has a convex shape with a curvature that gradually changes as the distance from the optical axis is increased, and the exit surface has a non-arc shape that is aspherical with respect to the optical axis.

The second imaging lens 62 focuses the light beams incident thereon mainly in the sub-scanning direction. In addition, the second imaging lens 62 also serves a certain distortion-correcting function in the main-scanning direction.

The imaging optical system 6 including the first and second imaging lenses 61 and 62 provides an imaging relationship in the sub-scanning direction such that the imaging optical system 6 can function as a surface-tilt correction optical system that provides a conjugate relationship between the deflecting surface 5*a* of the light deflector 5 and the photosensitive drum surface 7.

It is not necessary to express the shapes of the first and second imaging lenses 61 and 62 with the functional expressions shown in Table 3-1, and other conventional expressions can be also used.

Values of Conditional Expressions (1) to (4) according to the present exemplary embodiment are shown in Table 3-2.

ture shown, the sub-scan image plane barely varies (the field curvature does not easily occur) even when the sub-scan field angle of the light-emitting portion is increased.

In the conventional structure, the field curvature in the sub-scanning direction shown in FIG. 21 is obtained as the sum of the field curvatures in the sub-scanning direction caused by the incident optical system (a first optical unit) including the collimating lens and the cylindrical lens and the imaging optical system (a second optical unit) including the imaging lens when the field angle in the sub-scanning direction is varied.

Figure 9:
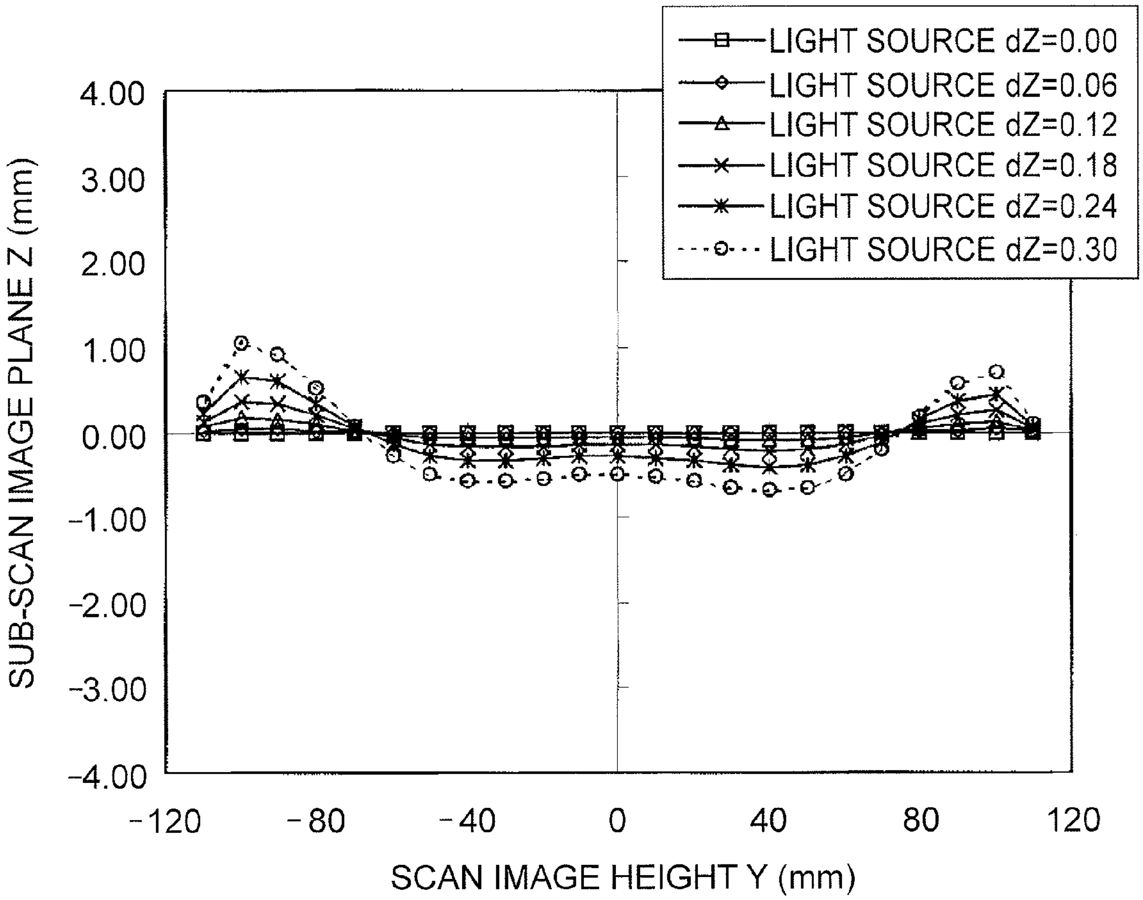
FIG. 9 illustrates a graph of the sub-scan image plane according to a third exemplary embodiment of the present invention.

In comparison, according to the present exemplary embodiment, a desirable image plane can be obtained as illustrated in FIG. 9 since the variation directions of the field curvatures caused by the incident optical system LA and the imaging optical system 6 in the sub-scanning direction due to the variation in the field angle in the sub-scanning direction are opposite to each other. In other words, the field curvatures cancel or reduce each other.

Figure 10:
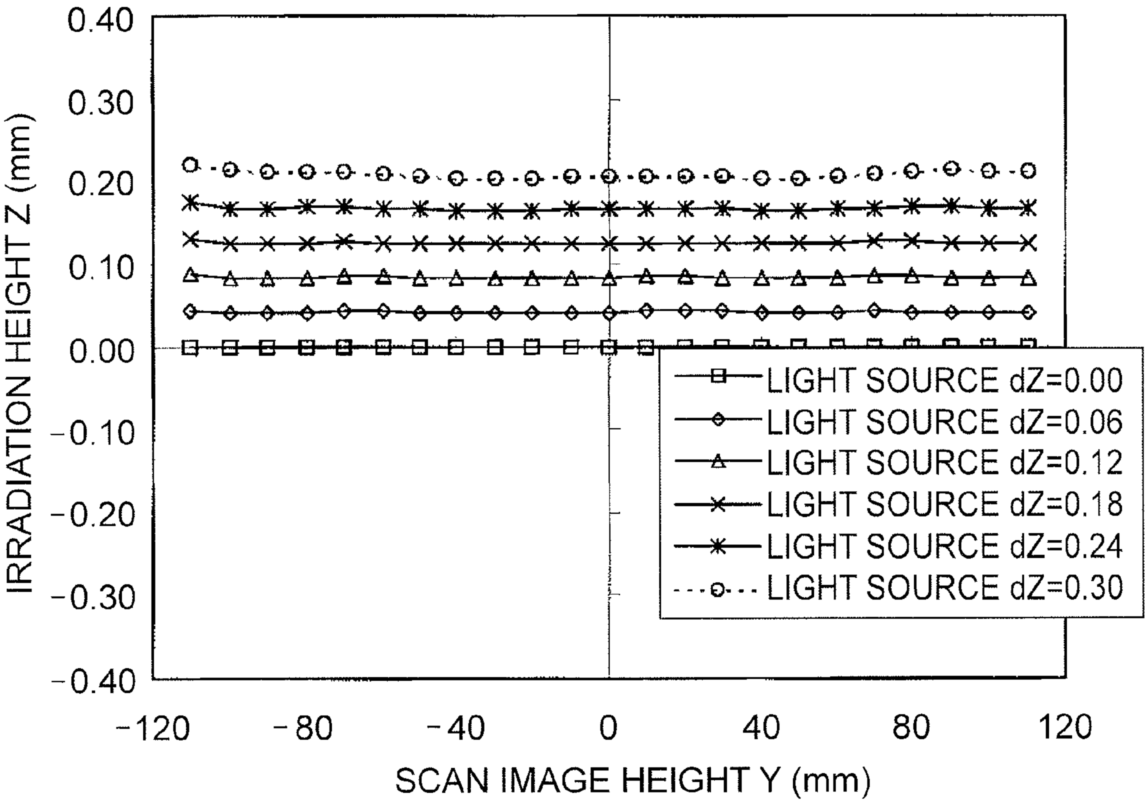
FIG. 10 illustrates a graph of the image-point irradiation height on an image plane in a sub-scanning direction according to the third exemplary embodiment of the present invention.

FIG. 10 illustrates a graph of the irradiation height of the image point on the surface to be scanned in the sub-scanning direction, where the vertical axis illustrates the irradiation height of the image point in the sub-scanning direction and the horizontal axis illustrates the image height on the surface to be scanned in the main-scanning direction (scan image height). The graph illustrates the case in which the light-emitting portions of the laser source 1 can be arranged such that the field angle is varied with 0.06 mm pitch in the range of Z=0.000 mm to 0.300 mm in terms of the distance from the optical axis of the collimating lens 2 in the sub-scanning direction.

TABLE 3-2

| | | | | | | |
|---|---|---|---|---|---|---|
| N | Number of Light-Emitting Units | 4 | 8 | 16 | 24 | 32 |
| IS | Image Circle (Diameter) | 0.090 | 0.210 | 0.450 | 0.690 | 0.930 |
| Lo | Largest Image Height of Light-Emitting Unit | 0.045 | 0.105 | 0.225 | 0.345 | 0.465 |
| Picth_LD | Pitch | 0.030 | 0.030 | 0.030 | 0.030 | 0.030 |
| θ_rot | Laser Rotating Angle | 0 | 0 | 0 | 0 | 0 |
| F_col | Focal Length of Collimating Lens | 20.0 | 20.0 | 20.0 | 20.0 | 20.0 |
| F_cl | Focal Length of Cylindrical Lens | 14.2 | 14.2 | 14.2 | 14.2 | 14.2 |
| β_Fθ | Sub-scan Magnification of Scanning System | 0.98 | 0.98 | 0.98 | 0.98 | 0.98 |
| DPI | Resolution | 1200 | 1200 | 1200 | 1200 | 1200 |
| PICTH | Pitch on Drum | 0.021 | 0.021 | 0.021 | 0.021 | 0.021 |
| Fno | F-number of Collimating Lens | 83.2 | 83.2 | 83.2 | 83.2 | 83.2 |
| Sl | Distance Between Aspherical Surface and Polygon | 95.7 | 95.7 | 95.7 | 95.7 | 95.7 |
| Expressions (1) and (2) | (N − 1) * F_col/(IS * β_Fθ * DPI) | 0.57 | 0.57 | 0.57 | 0.57 | 0.57 |
| Expressions (3) and (4) | (sl/f_col + β_o) * Lo/(Sl/(β_o * Fno * 2)) | 0.31 | 0.73 | 1.56 | 2.39 | 3.22 |

In the present exemplary embodiment, a substantial portion of the Conditional Expressions (1) to (4) are satisfied, as is clear from Table 3-2.

In Table 3-2, the pitch on the surface to be scanned (photosensitive drum surface) in the sub-scanning direction is set (e.g., to 1200 dpi), and the number of light-emitting portions arranged in the laser source 1 is varied from 4 to 32. The arrangement pitch in the laser source 1 is 30 μm and the arrangement direction is the same as the sub-scanning direction (laser rotational angle is 0°).

FIGS. 9 and 10 show aberrations obtained when the laser source 1 has a field angle in the sub-scanning direction.

FIG. 9 illustrates a graph of the paraxial image plane in the sub-scanning direction, where the vertical axis illustrates the paraxial image plane in the sub-scanning direction (sub-scan image plane) and the horizontal axis illustrates the image height (scan image height) on a surface to be scanned in the main-scanning direction. The graph illustrates the case in which the light-emitting portions of the laser source 1 can be arranged such that the field angle is varied with 0.06 mm pitch in the range of Z=0.000 mm to 0.300 mm in terms of the distance from the optical axis of the collimating lens 2 in the sub-scanning direction. As is clear from FIG. 9, unlike the graph shown in FIG. 21 according to the conventional struc- As is clear from FIG. 10, unlike the graph shown in FIG. 22 according to the conventional structure, the gap between the beams in the sub-scanning direction (sub-scan pitch) barely varies depending on the main-scan image height even when the sub-scan field angle of the light-emitting portion is increased. Although the amount of variation in the sub-san pitch is large in the regions where the scan image height is large in the graph shown in FIG. 22, the pitch is uniform in the present exemplary embodiment. In other words, the distortion (DIST) in the sub-scanning direction is corrected or error reduced in the present exemplary embodiment.

In the conventional structure, the distortion (DIST) in the sub-scanning direction shown in FIG. 22 is obtained as the sum of the distortions (DIST) in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, desirable scan lines with uniform image-point irradiation height can be obtained as illustrated in FIG. 10 since the variation directions of the distortions (DIST) caused by the incident optical system LA and the imaging optical system 6 in the sub-scanning direction due to the variation in the field angle in the sub-scanning direction are opposite to each other. In other words, the distortions (DIST) cancel each other.

Figure 11:
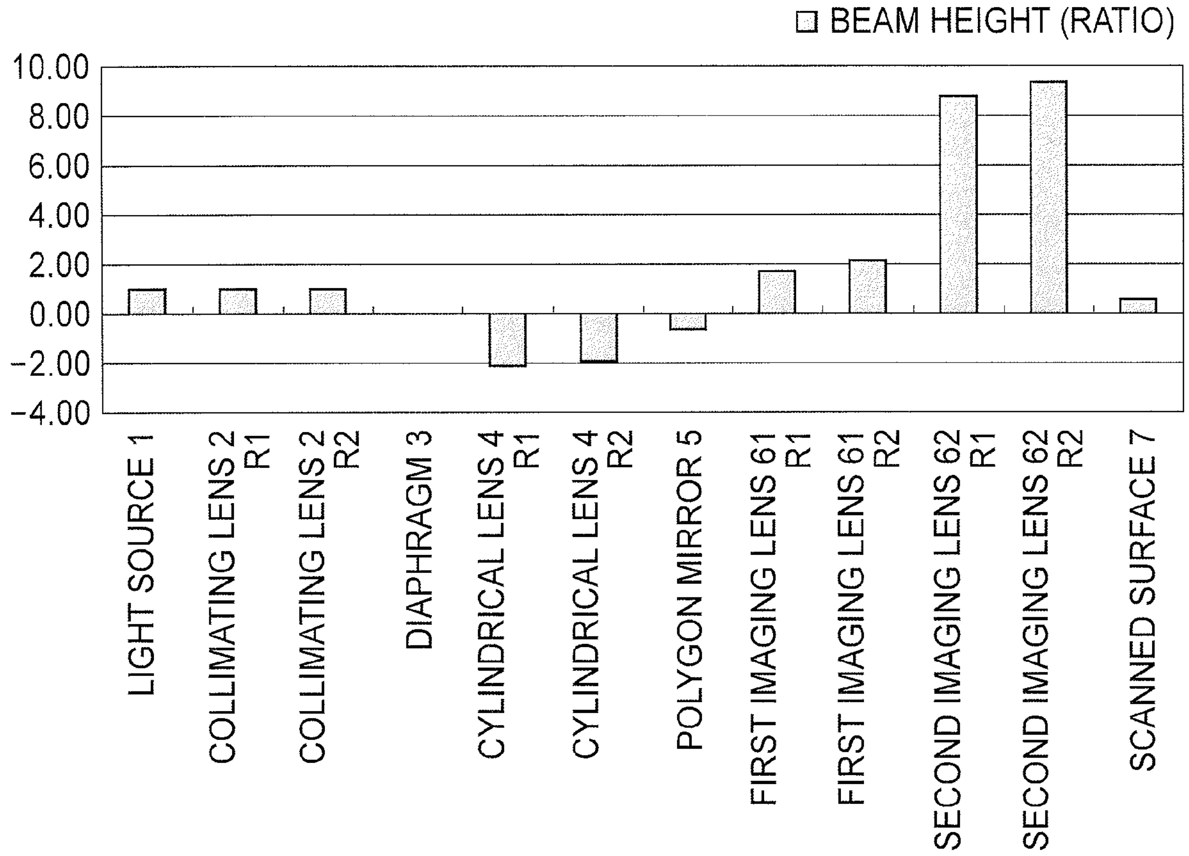
FIG. 11 illustrates a graph of the beam height in each surface according to the third exemplary embodiment of the present invention.

FIG. 11 illustrates a graph showing the positions in the sub-scanning direction at which the principal ray of the light beam emitted from the light-emitting portion farthest from the optical axis in the sub-scanning cross section passes through the optical elements. The distances from the optical axis are normalized such that the distance between the optical axis and the light-emitting portion farthest therefrom equals 1.

As illustrated in FIG. 11, the beam is farthest from the optical axis when the beam passes through the second imaging lens 62, and accordingly the shape of the exit surface of the second imaging lens 62 is aspherical in the sub-scanning cross section.

Fourth Exemplary Embodiment

Figure 12:
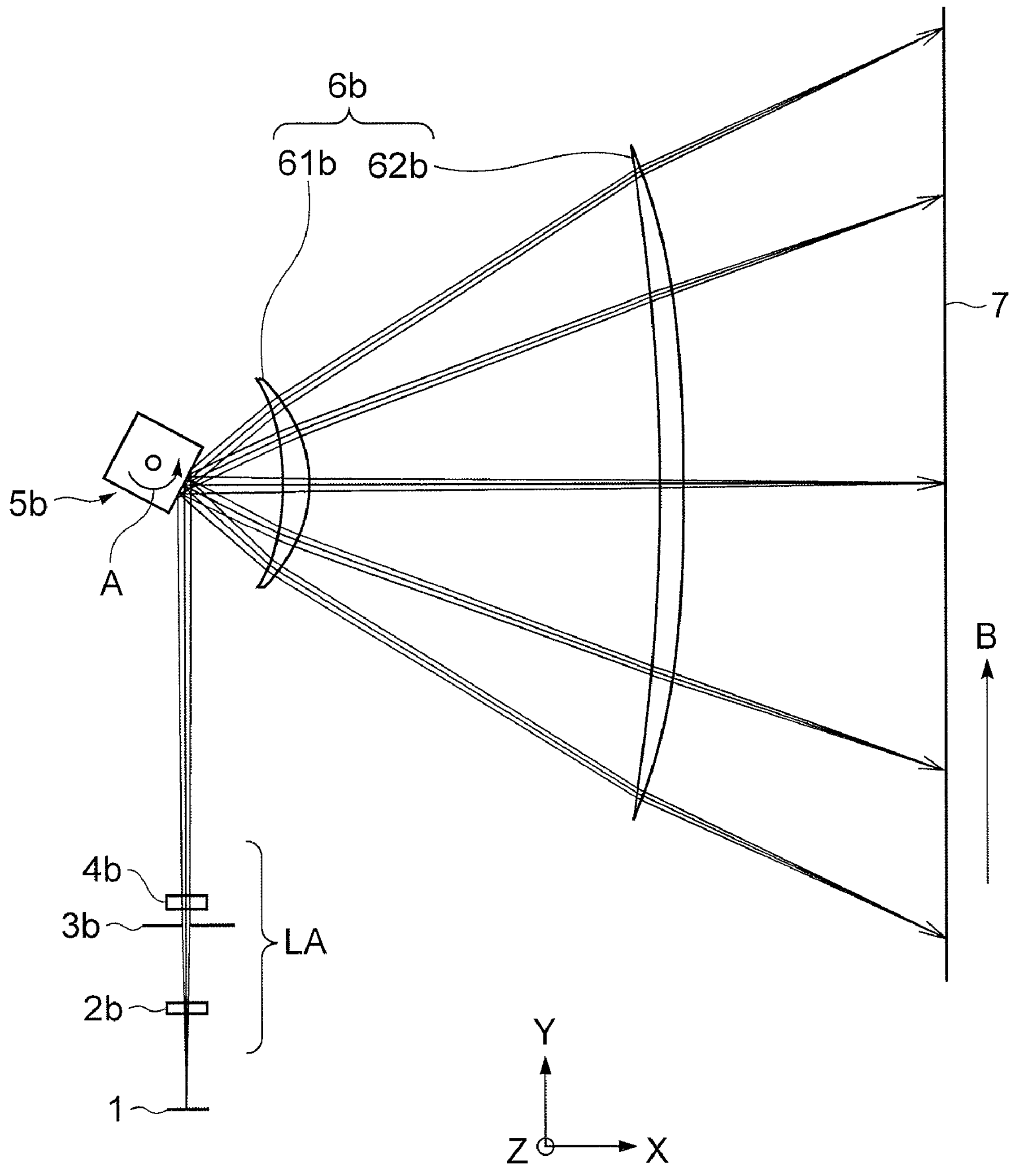
FIG. 12 illustrates a main-scanning cross section according to a fourth exemplary embodiment of the present invention.

FIG. 12 illustrates a cross section of the main part of an optical scanning apparatus according to a fourth exemplary embodiment of the present invention taken along a main-scanning direction (main-scanning cross section). In FIG. 12, components related to those shown in FIGS. 1A and 1B are denoted by the same reference numerals but with a "b" after the numerals to signify that the components in the fourth exemplary embodiment can have different optical values and properties than the exemplary embodiments that refer to FIGS. 1A and 1B.

The present exemplary embodiment differs from the above-described first exemplary embodiment in that the distance between the light-emitting portions in the sub-scanning direction is changed. Other structures and the optical operation of the present exemplary embodiment are related to those of the first exemplary embodiment, and effects related to those of the first exemplary embodiment can also be obtained in the present exemplary embodiment.

Table 4-1 shows data of the optical scanning apparatus according to the present exemplary embodiment. Expressions used in Table 4-1 are related to those used in the first exemplary embodiment. In addition, values of Conditional Expressions (1) to (4) according to the present exemplary embodiment are shown in Table 4-2.

TABLE 4-1

| | Surface No. | Curvature (Main) | Curvature (Sub) | Surface Gap | Refractive Index |
|---|---|---|---|---|---|
| Light Source 1 | 0 | | | 23.251 | |
| Collimating Lens 2b R1 | 1 | ∞ | ∞ | 3.000 | 1.762 |
| Collimating Lens 2b R2 | 2 | −19.042 | −19.042 | 20.000 | |
| Diaphragm 3b | 3 | ∞ | ∞ | 1.365 | |
| Cylindrical Lens 4b R1 | 4 | ∞ | 76.167 | 3.000 | 1.762 |
| Cylindrical Lens 4b R2 | 5 | ∞ | ∞ | 99.300 | |
| Polygon Mirror 5b | 6 | ∞ | ∞ | 24.200 | |
| First Imaging Lens 61b R1 | 7 | Aspherical (see below) | Aspherical (see below) | 6.000 | 1.524 |
| First Imaging Lens 61b R2 | 8 | Aspherical (see below) | Aspherical (see below) | 84.787 | |
| Second Imaging Lens 62b R1 | 9 | Aspherical (see below) | Aspherical (see below) | 5.800 | 1.524 |
| Second Imaging Lens 62b R2 | 10 | Aspherical (see below) | Aspherical (see below) | 62.545 | |
| A surface to be scanned 7 | 11 | | | | |

| | |
|---|---|
| Fθ Coefficient | 150.0 |
| Sub-scan Magnification of Fθ Lens | 0.52 |
| Focal Length of Collimating Lens 2b | 25.0 |
| Focal Length of Cylindrical Lens 4b | 100.0 |
| Shape of Diaphragm | Elliptical Main: 3.20 * Sub: 1.10 |
| Deflector | Circumcircle φ20/Four Reflecting Surfaces |

| Meridional Line (Upper) | | Meridional Line (Lower) | | Sagittal Line (Upper) | | Sagittal Line (Lower) | |
|---|---|---|---|---|---|---|---|
| Seventh Surface Expression A | | | | | | | |
| R | | −6.25E+01 | | r | | ∞ | |
| Ku | 3.06E+00 | Kl | 3.06E+00 | D2u | 0.00E+00 | D2l | 0.00E+00 |
| B4u | 3.83E−06 | B4l | 3.83E−06 | D4u | 0.00E+00 | D4l | 0.00E+00 |
| B6u | −5.53E−09 | B6l | −5.53E−09 | D6u | 0.00E+00 | D6l | 0.00E+00 |
| B8u | 5.50E−12 | B8l | 5.50E−12 | D8u | 0.00E+00 | D8l | 0.00E+00 |
| B10u | −2.24E−16 | B10l | −2.24E−16 | D10u | 0.00E+00 | D10l | 0.00E+00 |
| Eighth Surface Expression A | | | | | | | |
| R | | −3.53E+01 | | r | | ∞ | |
| Ku | −2.37E−01 | Kl | −2.37E−01 | D2u | 0.00E+00 | D2l | 0.00E+00 |
| B4u | 1.39E−06 | B4l | 1.42E−06 | D4u | 0.00E+00 | D4l | 0.00E+00 |
| B6u | −1.69E−09 | B6l | −1.87E−09 | D6u | 0.00E+00 | D6l | 0.00E+00 |
| B8u | −3.94E−12 | B8l | −3.35E−12 | D8u | 0.00E+00 | D8l | 0.00E+00 |

TABLE 4-1-continued

| | | | | | | | |
|---|---|---|---|---|---|---|---|
| B10u | 2.47E−15 | B10l | 1.95E−15 | D10u | 0.00E+00 | D10l | 0.00E+00 |
| | | | Ninth Surface Expression A | | | | |
| R | | −4.89E+02 | | r | | −9.39E+01 | |
| Ku | 0.00E+00 | Kl | 0.00E+00 | D2u | −1.71E−04 | D2l | −1.71E−04 |
| B4u | 0.00E+00 | B4l | 0.00E+00 | D4u | 1.56E−08 | D4l | 1.56E−08 |
| B6u | 0.00E+00 | B6l | 0.00E+00 | D6u | 0.00E+00 | D6l | 0.00E+00 |
| B8u | 0.00E+00 | B8l | 0.00E+00 | D8u | 0.00E+00 | D8l | 0.00E+00 |
| B10u | 0.00E+00 | B10l | 0.00E+00 | D10u | 0.00E+00 | D10l | 0.00E+00 |
| | | | Tenth Surface Expression B | | | | |
| R | | −1.31E+03 | | | | | |
| Ku | −1.55E+03 | Kl | −1.54E+03 | | | | |
| B4u | −3.37E−07 | B4l | −3.74E+07 | | | | |
| B6u | 3.40E−11 | B6l | 3.40E−11 | | | | |
| B8u | −2.14E−15 | B8l | −2.15E−15 | | | | |
| B10u | 0.00E+00 | B10l | 0.00E+00 | | | | |
| E02 | −2.83E−02 | | | | | | |
| E12 | 3.70E−07 | | | | | | |
| E04 | 2.75E−05 | | | | | | |
| E22 | 7.18E−07 | | | | | | |
| E14 | −1.25E−08 | | | | | | |
| E32 | 9.78E−11 | | | | | | |
| E24 | −7.71E−09 | | | | | | |
| E42 | −4.34E−10 | | | | | | |
| E52 | 1.17E−14 | | | | | | |
| E44 | −2.16E−12 | | | | | | |
| E62 | 4.35E−14 | | | | | | |
| E64 | 4.23E−16 | | | | | | |
| E82 | −1.06E−18 | | | | | | |

| | | | | | | |
|---|---|---|---|---|---|---|
| N | Number of Light-Emitting Units | 4 | 8 | 16 | 24 | 32 |
| IS | Image Circle (Diameter) | 0.030 | 0.070 | 0.150 | 0.230 | 0.310 |
| Lo | Largest Image Height of Light-Emitting Unit | 0.015 | 0.035 | 0.075 | 0.115 | 0.155 |
| Picth_LD | Pitch | 0.010 | 0.010 | 0.010 | 0.010 | 0.010 |
| θ_rot | Laser Rotating Angle | 0 | 0 | 0 | 0 | 0 |
| F_col | Focal Length of Collimating Lens | 25.0 | 25.0 | 25.0 | 25.0 | 25.0 |
| F_cl | Focal Length of Cylindrical Lens | 100.0 | 100.0 | 100.0 | 100.0 | 100.0 |
| β_Fθ | Sub-scan Magnification of Scanning System | 0.52 | 0.52 | 0.52 | 0.52 | 0.52 |
| DPI | Resolution | 1200 | 1200 | 1200 | 1200 | 1200 |
| PICTH | Pitch on Drum | 0.021 | 0.021 | 0.021 | 0.021 | 0.021 |
| Fno | F-number of Collimating Lens | 22.7 | 22.7 | 22.7 | 22.7 | 22.7 |
| SI | Distance Between Aspherical Surface and Polygon | 120.8 | 120.8 | 120.8 | 120.8 | 120.8 |
| Expressions (1) and (2) | (N − 1) * F_col/(IS * β_Fθ * DPI) | 3.99 | 3.99 | 3.99 | 3.99 | 3.99 |
| Expressions (3) and (4) | (s1/f_col + β_0) * Lo/(S1/(β_o * Fno * 2)) | 0.20 | 0.47 | 1.01 | 1.55 | 2.09 |

In the present exemplary embodiment, a substantial portion of the Conditional Expressions (1) to (4) are satisfied, as is clear from Table 4-2.

In Table 4-2, the pitch on the surface to be scanned (photosensitive drum surface) in the sub-scanning direction is set (e.g., to 1200 dpi), and the number of light-emitting portions arranged in the laser source 1 is varied from 4 to 32. The arrangement pitch in the laser source 1 is 10 μm and the arrangement direction is the same as the sub-scanning direction (laser rotational angle is 0°).

Figure 13:
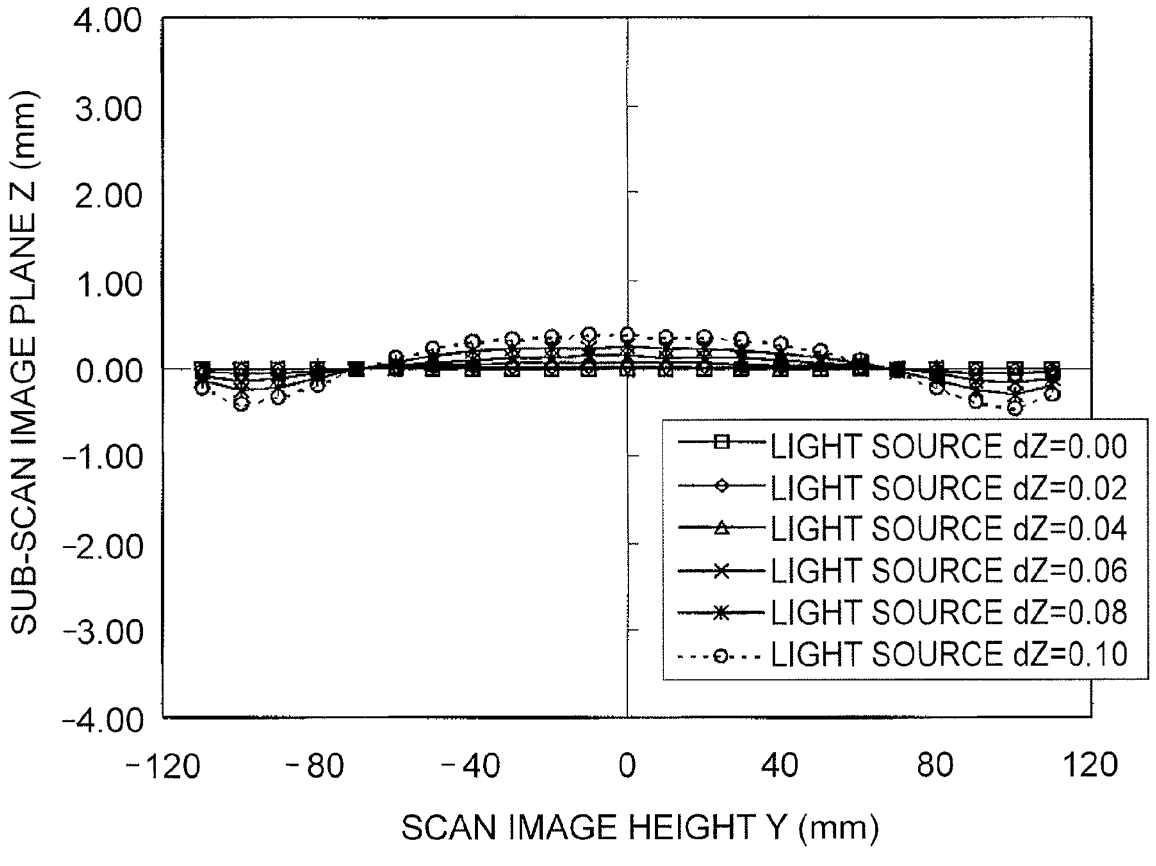
FIG. 13 illustrates a graph of the sub-scan image plane according to the fourth exemplary embodiment of the present invention.
Figure 14:
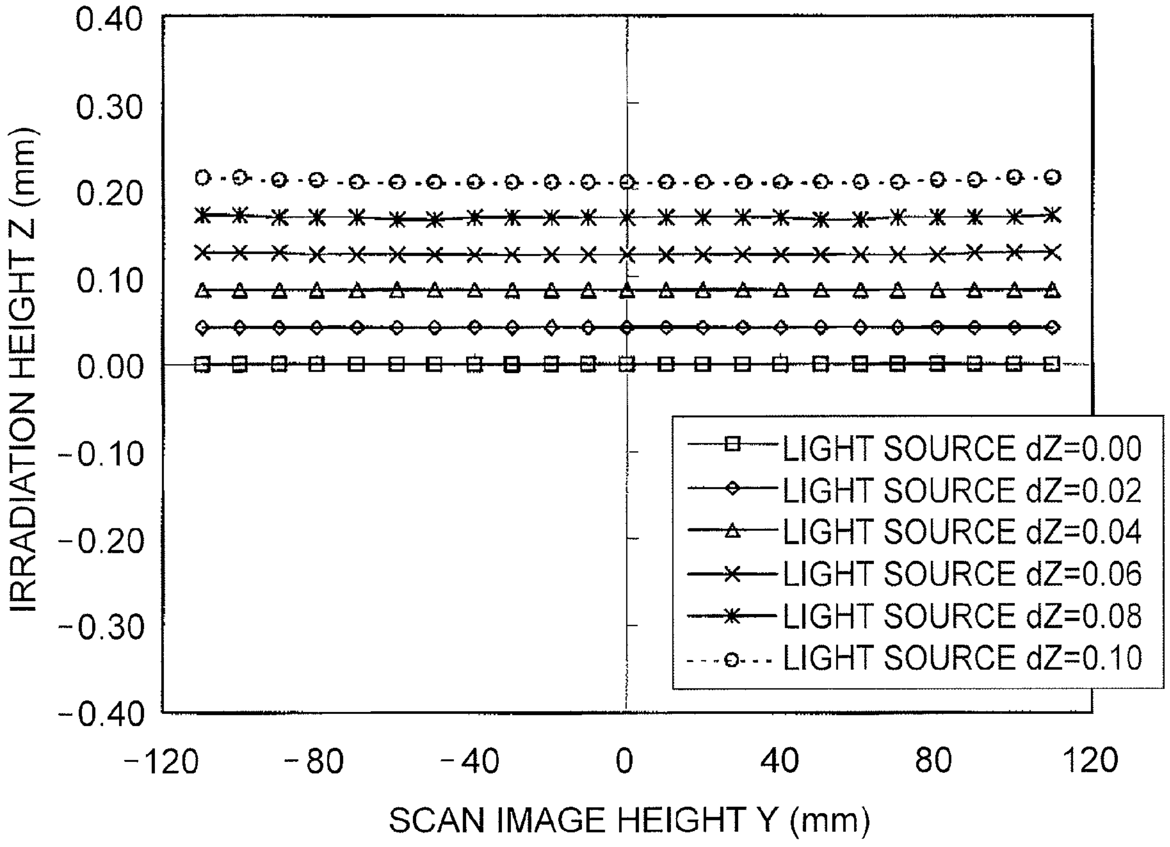
FIG. 14 illustrates a graph of the image-point irradiation height on an image plane in a sub-scanning direction according to the fourth exemplary embodiment of the present invention.

FIGS. 13 and 14 show aberrations obtained when the laser source 1 has a field angle in the sub-scanning direction.

FIG. 13 illustrates a graph of the paraxial image plane in the sub-scanning direction, where the vertical axis illustrates the paraxial image plane in the sub-scanning direction (sub-scan image plane) and the horizontal axis illustrates the image height (scan image height) on a surface to be scanned in the main-scanning direction. The graph illustrates the case in which the light-emitting portions of the laser source 1 can be arranged such that the field angle is varied with 0.02 mm pitch in the range of Z=0.000 mm to 0.100 mm in terms of the distance from the optical axis of the collimating lens 2 in the sub-scanning direction. As is clear from FIG. 13, unlike the graph shown in FIG. 21 according to the conventional structure shown, the sub-scan image plane barely varies (the field curvature does not easily occur) even when the sub-scan field angle of the light-emitting portion is increased.

In the conventional structure, the field curvature in the sub-scanning direction shown in FIG. 21 is obtained as the sum of the field curvatures in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, a desirable image plane can be obtained as illustrated in FIG. 13 since the variation directions of the field curvatures caused by the incident optical system LA and the imaging optical system 6 in the sub-scanning direction due to the variation in the field angle in the sub-scanning direction are opposite to each other. In other words, the field curvatures cancel each other.

FIG. 14 illustrates a graph of the irradiation height of the image point on the surface to be scanned in the sub-scanning direction, where the vertical axis illustrates the irradiation height of the image point in the sub-scanning direction and the horizontal axis illustrates the image height on the surface to be scanned in the main-scanning direction (scan image height). The graph illustrates the case in which the light-emitting portions of the laser source 1 can be arranged such that the field angle is varied with 0.02 mm pitch in the range of Z=0.000 mm to 0.100 mm in terms of the distance from the optical axis of the collimating lens 2 in the sub-scanning direction.

As is clear from FIG. 14, unlike the graph shown in FIG. 22 according to the conventional structure, the gap between the beams in the sub-scanning direction (sub-scan pitch) barely varies depending on the main-scan image height even when the sub-scan field angle of the light-emitting portion is increased. Although the amount of variation in the sub-san pitch is large in the regions where the scan image height is large in the graph shown in FIG. 22, the pitch is uniform in the present exemplary embodiment. In other words, the distortion (DIST) in the sub-scanning direction is corrected or error reduced in the present exemplary embodiment.

In the conventional structure, the distortion (DIST) in the sub-scanning direction shown in FIG. 22 is obtained as the sum of the distortions (DIST) in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, desirable scan lines with uniform image-point irradiation height can be obtained as illustrated in FIG. 14 since the variation directions of the distortions (DIST) caused by the incident optical system LA and the imaging optical system 6*b* in the sub-scanning direction due to the variation in the field angle in the sub-scanning direction are opposite to each other. In other words, the distortions (DIST) cancel and/or reduce each other.

Figure 15:
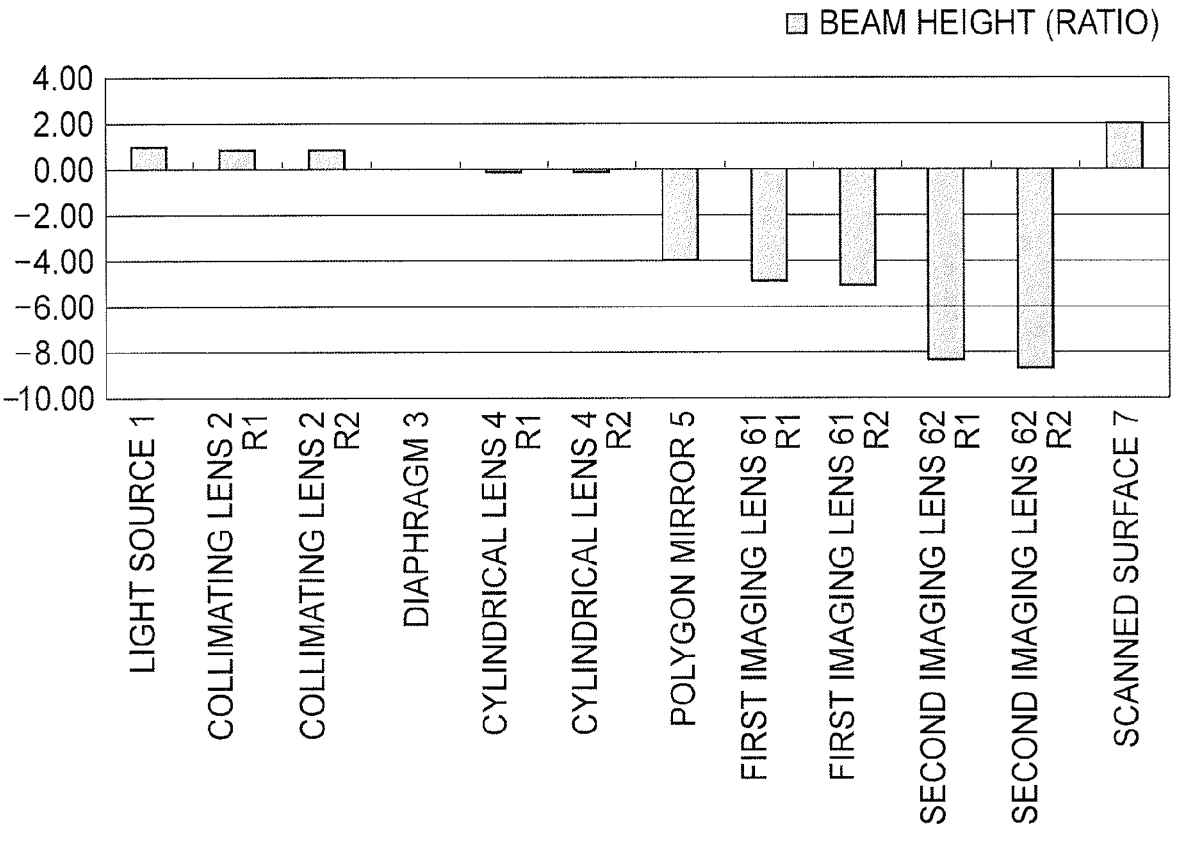
FIG. 15 illustrates a graph of the beam height in each surface according to the fourth exemplary embodiment of the present invention.

FIG. 15 illustrates a graph showing the positions in the sub-scanning direction at which the principal ray of the light beam emitted from the light-emitting portion farthest from the optical axis in the sub-scanning cross section passes through the optical elements. The distances from the optical axis are normalized such that the distance between the optical axis and the light-emitting portion farthest therefrom equals 1.

As illustrated in FIG. 15, the beam is farthest from the optical axis when the beam passes through the second imaging lens 62*b*, and accordingly the shape of the exit surface of the second imaging lens 62*b* is aspherical in the sub-scanning cross section.

Fifth Exemplary Embodiment

Next, an optical scanning apparatus according to a fifth exemplary embodiment will be described below. The structure of the optical system is related to that shown in FIGS. 1A and 1B and thus discussion of the fifth exemplary embodiment will refer to the same reference numerals as in FIGS. 1A and 1B but with different properties, as discussed below.

The present exemplary embodiment differs from the above-described first exemplary embodiment in that the distance between the light-emitting portions in the sub-scanning direction is changed. Other structures and the optical operation of the present exemplary embodiment are related to those of the first exemplary embodiment, and effects related to those of the first exemplary embodiment can also be obtained in the present exemplary embodiment.

Table 5-1 shows data of the optical scanning apparatus according to the present exemplary embodiment. Expressions used in Table 5-1 are related to those used in the first exemplary embodiment. In addition, values of Conditional Expressions (1) to (4) according to the present exemplary embodiment are shown in Table 5-2.

TABLE 5-1

| | Surface No. | Curvature (Main) | Curvature (Sub) | Surface Gap | Refractive Index |
|---|---|---|---|---|---|
| Light Source 1 | 0 | | | 48.098 | |
| Collimating Lens 2 R1 | 1 | ∞ | ∞ | 3.000 | 1.762 |
| Collimating Lens 2 R2 | 2 | −38.080 | −38.080 | 20.000 | |
| Diaphragm 3 | 3 | ∞ | ∞ | 1.365 | |
| Cylindrical Lens 4 R1 | 4 | ∞ | 152.33 | 3.000 | 1.762 |
| Cylindrical Lens 4 R2 | 5 | ∞ | ∞ | 200.300 | |
| Polygon Mirror 5 | 6 | ∞ | ∞ | 24.200 | |
| First Imaging Lens 61 R1 | 7 | Aspherical (see below) | Aspherical (see below) | 6.000 | 1.524 |
| First Imaging Lens 61 R2 | 8 | Aspherical (see below) | Aspherical (see below) | 85.076 | |
| Second Imaging Lens 62 R1 | 9 | Aspherical (see below) | Aspherical (see below) | 5.000 | 1.524 |
| Second Imaging Lens 62 R2 | 10 | Aspherical (see below) | Aspherical (see below) | 62.290 | |
| A surface to be scanned 7 | 11 | | | | |

| | |
|---|---|
| Fθ Coefficient | 150.0 |
| Sub-scan Magnification of Fθ Lens | 0.52 |
| Focal Length of Collimating Lens 2 | 50.0 |
| Focal Length of Cylindrical Lens 4 | 200.0 |
| Shape of Diaphragm | Elliptical Main: 3.20 * Sub: 2.20 |
| Deflector | Circumcircle φ20/Four Reflecting Surfaces |

TABLE 5-1-continued

| Meridional Line (Upper) | | Meridional Line (Lower) | | Sagittal Line (Upper) | | Sagittal Line (Lower) | |
|---|---|---|---|---|---|---|---|
| Seventh Surface Expression A | | | | | | | |
| R | −6.35E+01 | | | R | ∞ | | |
| Ku | 3.15E+00 | Kl | 3.15E+00 | D2u | 0.00E+00 | D2l | 0.00E+00 |
| B4u | 3.84E−06 | B4l | 3.84E−06 | D4u | 0.00E+00 | D4l | 0.00E+00 |
| B6u | −5.54E−09 | B6l | −5.54E−09 | D6u | 0.00E+00 | D6l | 0.00E+00 |
| B8u | 5.69E−12 | B8l | 5.69E−12 | D8u | 0.00E+00 | D8l | 0.00E+00 |
| B10u | −4.90E−16 | B10l | −4.90E−16 | D10u | 0.00E+00 | D10l | 0.00E+00 |
| Eighth Surface Expression A | | | | | | | |
| R | −3.56E+01 | | | R | ∞ | | |
| Ku | −2.21E−01 | Kl | −2.21E−01 | D2u | 0.00E+00 | D2l | 0.00E+00 |
| B4u | 1.53E−06 | B4l | 1.55E−06 | D4u | 0.00E+00 | D4l | 0.00E+00 |
| B6u | −1.86E−09 | B6l | −2.01E−09 | D6u | 0.00E+00 | D6l | 0.00E+00 |
| B8u | −3.80E−12 | B8l | −3.25E−12 | D8u | 0.00E+00 | D8l | 0.00E+00 |
| B10u | 2.72E−15 | B10l | 2.19E−15 | D10u | 0.00E+00 | D10l | 0.00E+00 |
| Ninth Surface Expression A | | | | | | | |
| R | −7.71E+02 | | | R | −9.70E+01 | | |
| Ku | 0.00E+00 | Kl | 0.00E+00 | D2u | −1.68E−04 | D2l | −1.68E−04 |
| B4u | 0.00E+00 | B4l | 0.00E+00 | D4u | 1.45E−08 | D4l | 1.45E−08 |
| B6u | 0.00E+00 | B6l | 0.00E+00 | D6u | 0.00E+00 | D6l | 0.00E+00 |
| B8u | 0.00E+00 | B8l | 0.00E+00 | D8u | 0.00E+00 | D8l | 0.00E+00 |
| B10u | 0.00E+00 | B10l | 0.00E+00 | D10u | 0.00E+00 | D10l | 0.00E+00 |
| Tenth Surface Expression B | | | | | | | |
| R | 1.24E+04 | | | | | | |
| Ku | −6.31E+03 | Kl | −6.30E+03 | | | | |
| B4u | −3.40E−07 | B4l | −3.40E−07 | | | | |
| B6u | 3.28E−11 | B6l | 3.28E−11 | | | | |
| B8u | −2.07E−15 | B8l | −2.07E−15 | | | | |
| B10u | 0.00E+00 | B10l | 0.00E+00 | | | | |
| E02 | −2.82E−02 | | | | | | |
| E12 | 4.96E−07 | | | | | | |
| E04 | 2.37E−05 | | | | | | |
| E22 | 7.54E−07 | | | | | | |
| E14 | −1.51E−08 | | | | | | |
| E32 | −3.57E−01 | | | | | | |
| E24 | −4.62E−09 | | | | | | |
| E42 | −4.30E−10 | | | | | | |
| E52 | 8.42E−15 | | | | | | |
| E44 | −2.05E−12 | | | | | | |
| E62 | 4.40E−14 | | | | | | |
| E64 | 3.19E−16 | | | | | | |
| E82 | −1.31E−18 | | | | | | |

TABLE 5-2

| | | | | | | |
|---|---|---|---|---|---|---|
| N | Number of Light-Emitting Units | 4 | 8 | 16 | 24 | 32 |
| IS | Image Circle (Diameter) | 0.030 | 0.070 | 0.150 | 0.230 | 0.310 |
| Lo | Largest Image Height of Light-Emitting Unit | 0.015 | 0.035 | 0.075 | 0.115 | 0.155 |
| Picth__LD | Pitch | 0.010 | 0.010 | 0.010 | 0.010 | 0.010 |
| θ__rot | Laser Rotating Angle | 0 | 0 | 0 | 0 | 0 |
| F__col | Focal Length of Collimating Lens | 50.0 | 50.0 | 50.0 | 50.0 | 50.0 |
| F__cl | Focal Length of Cylindrical Lens | 200.0 | 200.0 | 200.0 | 200.0 | 200.0 |
| β__Fθ | Sub-scan Magnification of Scanning System | 0.52 | 0.52 | 0.52 | 0.52 | 0.52 |
| DPI | Resolution | 1200 | 1200 | 1200 | 1200 | 1200 |
| PICTH | Pitch on Drum | 0.021 | 0.021 | 0.021 | 0.021 | 0.021 |
| Fno | F-number of Collimating Lens | 22.7 | 22.7 | 22.7 | 22.7 | 22.7 |
| Sl | Distance Between Aspherical Surface and Polygon | 121.1 | 121.1 | 121.1 | 121.1 | 121.1 |
| Expressions (1) and (2) | (N − 1) * F__col/(IS * β__Fθ * DPI) | 7.98 | 7.98 | 7.98 | 7.98 | 7.98 |
| Expressions (3) and (4) | (sl/f__col + β__o) * Lo/(Sl/(β__o * Fno * 2)) | 0.15 | 0.34 | 0.74 | 1.13 | 1.52 |

In the present exemplary embodiment, a substantial portion of the Conditional Expressions (1) to (4) are satisfied, as is clear from Table 5-2.

In Table 5-2, the pitch on the surface to be scanned (photosensitive drum surface) in the sub-scanning direction is set (e.g., to 1200 dpi), and the number of light-emitting portions arranged in the laser source 1 is varied from 4 to 32. The arrangement pitch in the laser source 1 is 10 μm and the arrangement direction is the same as the sub-scanning direction (laser rotational angle is 0°).

Figure 16:
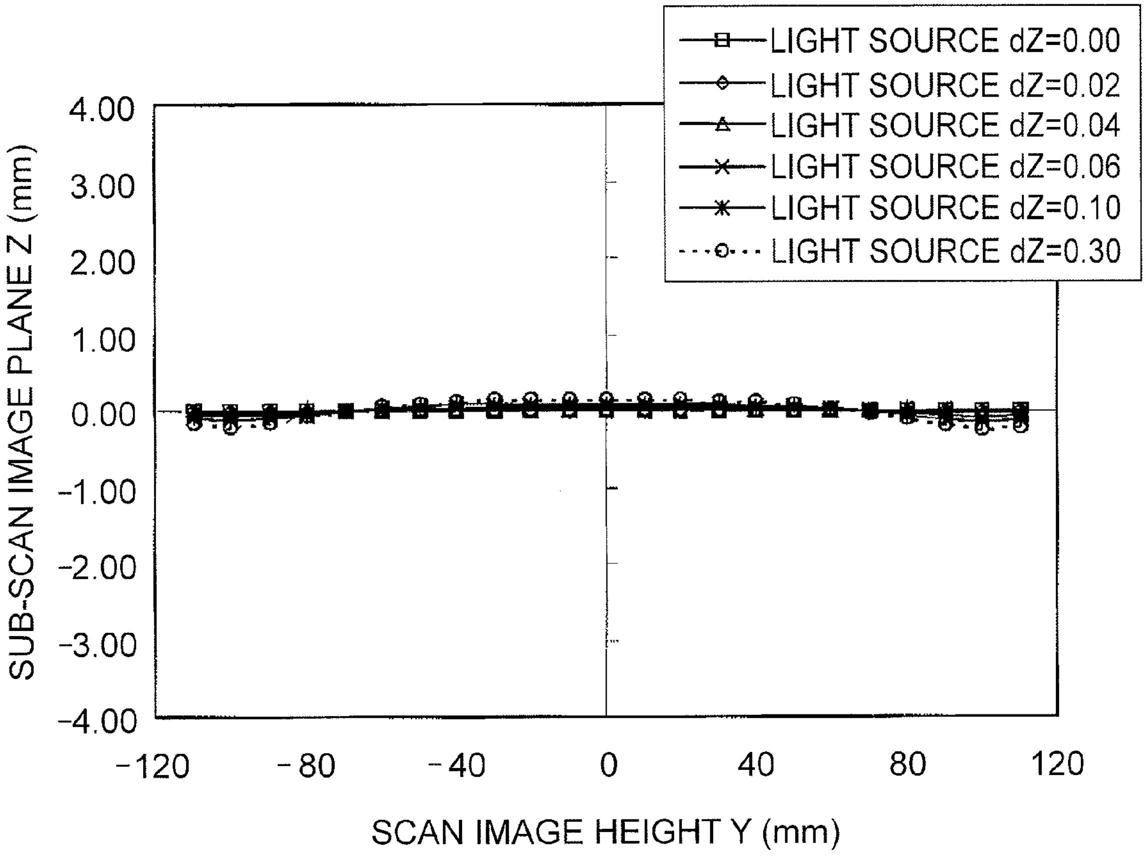
FIG. 16 illustrates a graph of the sub-scan image plane according to a fifth exemplary embodiment of the present invention.
Figure 17:
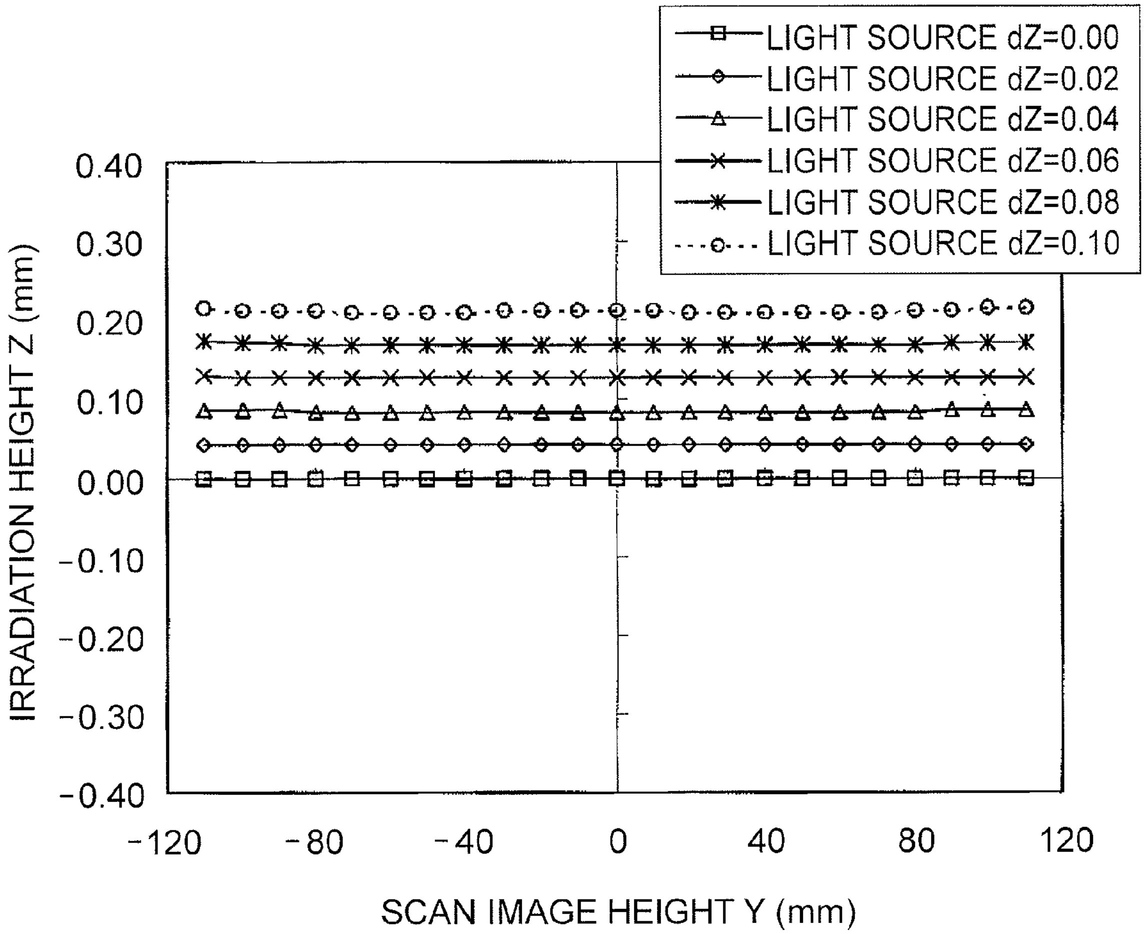
FIG. 17 illustrates a graph of the image-point irradiation height on an image plane in a sub-scanning direction according to the fifth exemplary embodiment of the present invention.

FIGS. 16 and 17 show aberrations obtained when the laser source 1 has a field angle in the sub-scanning direction.

FIG. 16 illustrates a graph of the paraxial image plane in the sub-scanning direction, where the vertical axis illustrates the paraxial image plane in the sub-scanning direction (sub-scan image plane) and the horizontal axis illustrates the image height (scan image height) on the a surface to be scanned in the main-scanning direction. The graph illustrates the case in which the light-emitting portions of the laser source 1 can be arranged such that the field angle is varied with 0.02 mm pitch in the range of Z=0.000 mm to 0.100 mm in terms of the distance from the optical axis of the collimating lens 2 in the sub-scanning direction. As is clear from FIG. 16, unlike the graph shown in FIG. 21 according to the conventional structure shown, the sub-scan image plane barely varies (the field curvature does not easily occur) even when the sub-scan field angle of the light-emitting portion is increased.

In the conventional structure, the field curvature in the sub-scanning direction shown in FIG. 21 is obtained as the sum of the field curvatures in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, an image plane can be obtained as illustrated in FIG. 16 since the variation directions of the field curvatures caused by the incident optical system LA and the imaging optical system 6 in the sub-scanning direction due to the variation in the field angle in the sub-scanning direction are opposite to each other. In other words, the field curvatures cancel each other.

FIG. 17 illustrates a graph of the irradiation height of the image point on the a surface to be scanned in the sub-scanning direction, where the vertical axis illustrates the irradiation height of the image point in the sub-scanning direction and the horizontal axis illustrates the image height on the a surface to be scanned in the main-scanning direction (scan image height). The graph illustrates the case in which the light-emitting portions of the laser source 1 can be arranged such that the field angle is varied with 0.02 mm pitch in the range of Z=0.000 mm to 0.100 mm in terms of the distance from the optical axis of the collimating lens 2 in the sub-scanning direction.

As is clear from FIG. 17, unlike the graph shown in FIG. 22 according to the conventional structure, the gap between the beams in the sub-scanning direction (sub-scan pitch) barely varies depending on the main-scan image height even when the sub-scan field angle of the light-emitting portion is increased. Although the amount of variation in the sub-san pitch is large in the regions where the scan image height is large in the graph shown in FIG. 22, the pitch is uniform in the present exemplary embodiment. In other words, the distortion (DIST) in the sub-scanning direction is corrected or error reduced in the present exemplary embodiment.

In the conventional structure, the distortion (DIST) in the sub-scanning direction shown in FIG. 22 is obtained as the sum of the distortions (DIST) in the sub-scanning direction caused by the incident optical system (a first optical unit) including the collimating lens and the cylindrical lens and the imaging optical system (a second optical unit) including the imaging lens when the field angle in the sub-scanning direction is varied.

In comparison, according to the present exemplary embodiment, desirable scan lines with uniform image-point irradiation height can be obtained as illustrated in FIG. 17 since the variation directions of the distortions (DIST) caused by the incident optical system LA and the imaging optical system 6 in the sub-scanning direction due to the variation in the field angle in the sub-scanning direction are opposite to each other. In other words, the distortions (DIST) cancel and/or reduce each other.

Figure 18:
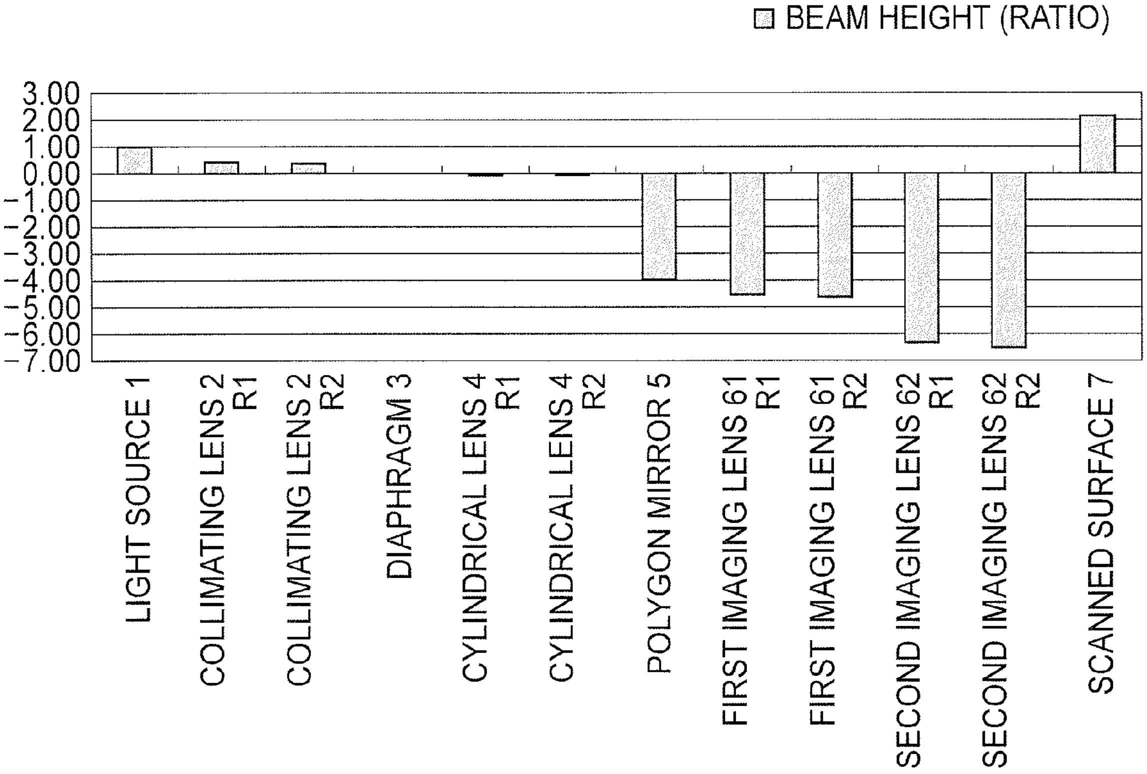
FIG. 18 illustrates a graph of the beam height in each surface according to the fifth exemplary embodiment of the present invention.

FIG. 18 illustrates a graph showing the positions in the sub-scanning direction at which the principal ray of the light beam emitted from the light-emitting portion farthest from the optical axis in the sub-scanning cross section passes through the optical elements. The distances from the optical axis are normalized such that the distance between the optical axis and the light-emitting portion farthest therefrom equals 1.

As illustrated in FIG. 18, the beam is farthest from the optical axis when the beam passes through the second imaging lens 62, and accordingly the shape of the exit surface of the second imaging lens 62 is aspherical in the sub-scanning cross section.

According to the first to fifth exemplary embodiments, a plurality of light-emitting portions can be arranged one-dimensionally in the Vertical Cavity Surface Emitting Laser, as is clear from Tables 1-2, 1-3, 2-2, 3-2, 4-2, and 5-2. However, the present invention is not limited to this or the values provided in the illustrative examples.

The present invention can be applied to Vertical Cavity Surface Emitting Laser in which a plurality of light-emitting portions can be arranged two-dimensionally.

For example, a surface-emitting laser including sixteen light-emitting portions arranged in two rows in the main-scanning direction and eight columns in the sub-scanning direction on the same substrate can also be used in at least one exemplary embodiment.

Image-Forming Apparatus

Figure 19:
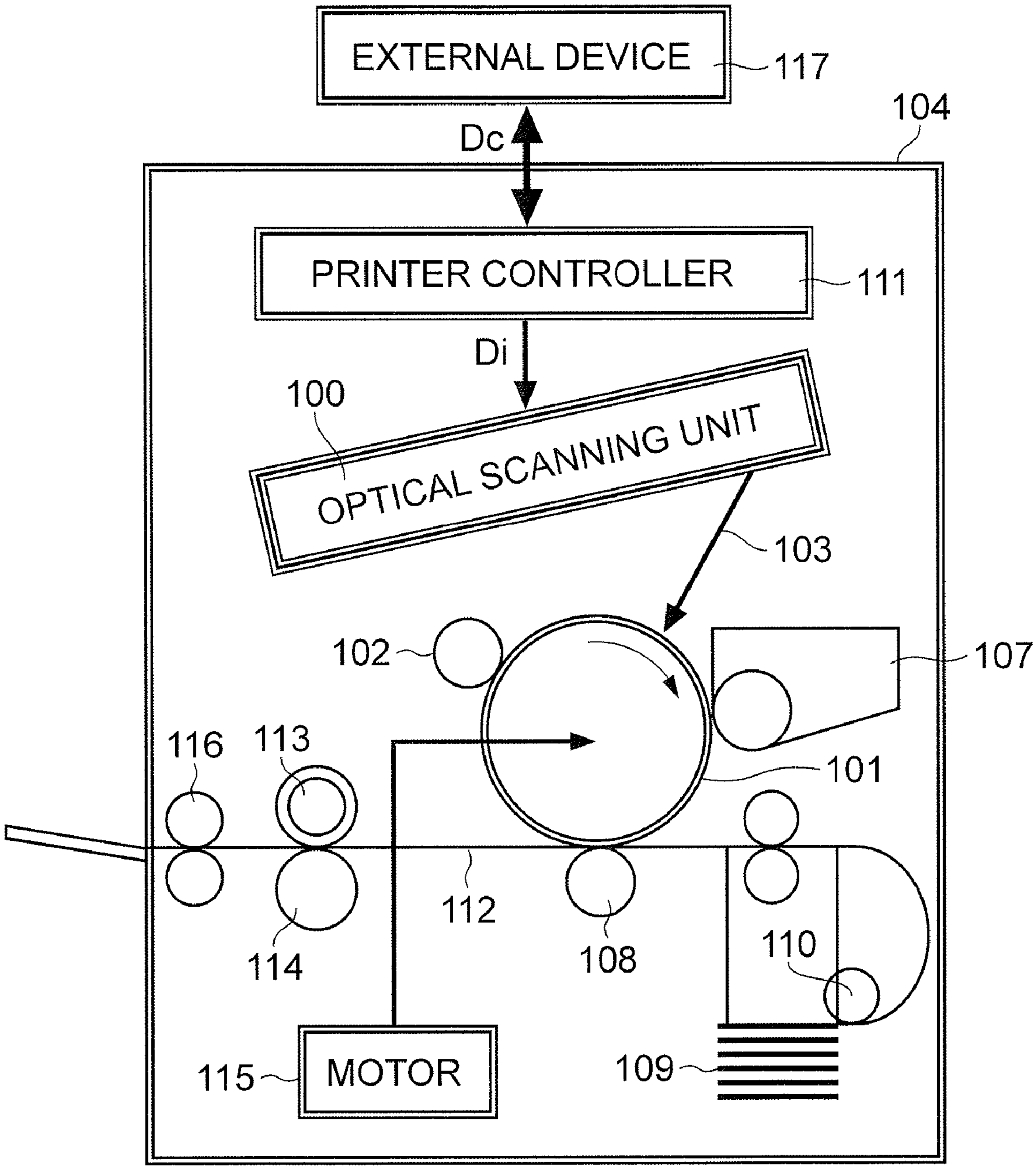
FIG. 19 is a schematic diagram illustrating an image-forming apparatus according to an exemplary embodiment of the present invention.

FIG. 19 is a cross-sectional view of the main portion of an image-forming apparatus according to an exemplary embodiment of the present invention taken along the sub-scanning direction. Referring to FIG. 19, an image-forming apparatus 104 receives code data Dc from an external device 117, (e.g., a personal computer). The code data Dc is converted into image data (dot data) Di by a printer controller 111 included in the image-forming apparatus 104. The image data Di is input to an optical scanning unit (optical scanning apparatus) 100, which can have a structure according to one of the above-described first to fifth exemplary embodiments. The optical scanning unit 100 emits a light beam 103 modulated in accordance with the image data Di and a photosensitive surface of a photosensitive drum 101 is scanned in the main scanning direction by the light beam 103.

The photosensitive drum 101 can function as an electrostatic latent image carrier (photosensitive member) and is rotated (e.g., clockwise) by a motor 115. Due to this rotation, the photosensitive surface of the photosensitive drum 101 moves relative to the light beam 103 in the sub-scanning direction, which is perpendicular to the main scanning direction. A charging roller 102 for uniformly charging the surface of the photosensitive drum 101 is provided above the photosensitive drum 101 in such a manner that the charging roller 102 is in contact with the surface of the photosensitive drum 101. The surface of the photosensitive drum 101 that is charged by the charging roller 102 is irradiated with the light beam 103 emitted from the optical scanning unit 100.

As described above, the light beam 103 is modulated on the basis of the image data Di, and the surface of the photosensitive drum 101 is irradiated with this light beam 103 so that an electrostatic latent image is formed thereon. The electrostatic latent image is developed as a toner image by a developing device 107 disposed such that the developing device 107 is in contact with the photosensitive drum 101 at a position on the downstream of the position at which the photosensitive drum 101 is irradiated with the light beam 103 in the rotating direction of the photosensitive drum 101.

The toner image developed by the developing device 107 is transferred onto a paper sheet 112 that can function as a transferring material by a transferring roller 108 disposed below the photosensitive drum 101 so as to face the photosensitive drum 101. Although the paper sheet 112 is fed from a paper cassette 109 disposed in front of the photosensitive drum 101 (on the right in FIG. 19) in this example, it can also be fed manually. A paper feed roller 110 that is disposed at an end of the paper cassette 109 conveys the paper sheet 112 contained in the paper cassette 109 to a transporting path.

The paper sheet 112 on which the unfixed toner image is transferred as described above is further transported to a fixing device disposed behind the photosensitive drum 101 (on the left in FIG. 19). The fixing device includes a fixing roller 113, which can have a fixing heater (not shown) therein, and a pressure roller 114 disposed so as to be in pressure contact with the fixing roller 113. The paper sheet 112 conveyed from the transferring section is pressed and heated in a nip portion between the fixing roller 113 and the pressure roller 114 so that the unfixed toner image on the paper 112 is fixed. Paper output rollers 116 are disposed behind the fixing roller 113 and the paper sheet 112 on which the image is fixed is output from the image-forming apparatus 104.

Although not shown in FIG. 19, the printer controller 111 not only performs the above-described data conversion but can also control components, such as the motor 115, included in the image-forming apparatus 104 and a light deflector, which will be described below, included in the optical scanning unit 100.

The recording density of the image-forming apparatus according to at least one exemplary embodiment is not particularly limited. However, the required image quality is increased as the recording density is increased, and therefore the structures according to the first to third exemplary embodiments of the present invention are effective for use in an image-forming apparatus with a recording density of 1200 dpi or more.

Color Image-Forming Apparatus

Figure 20:
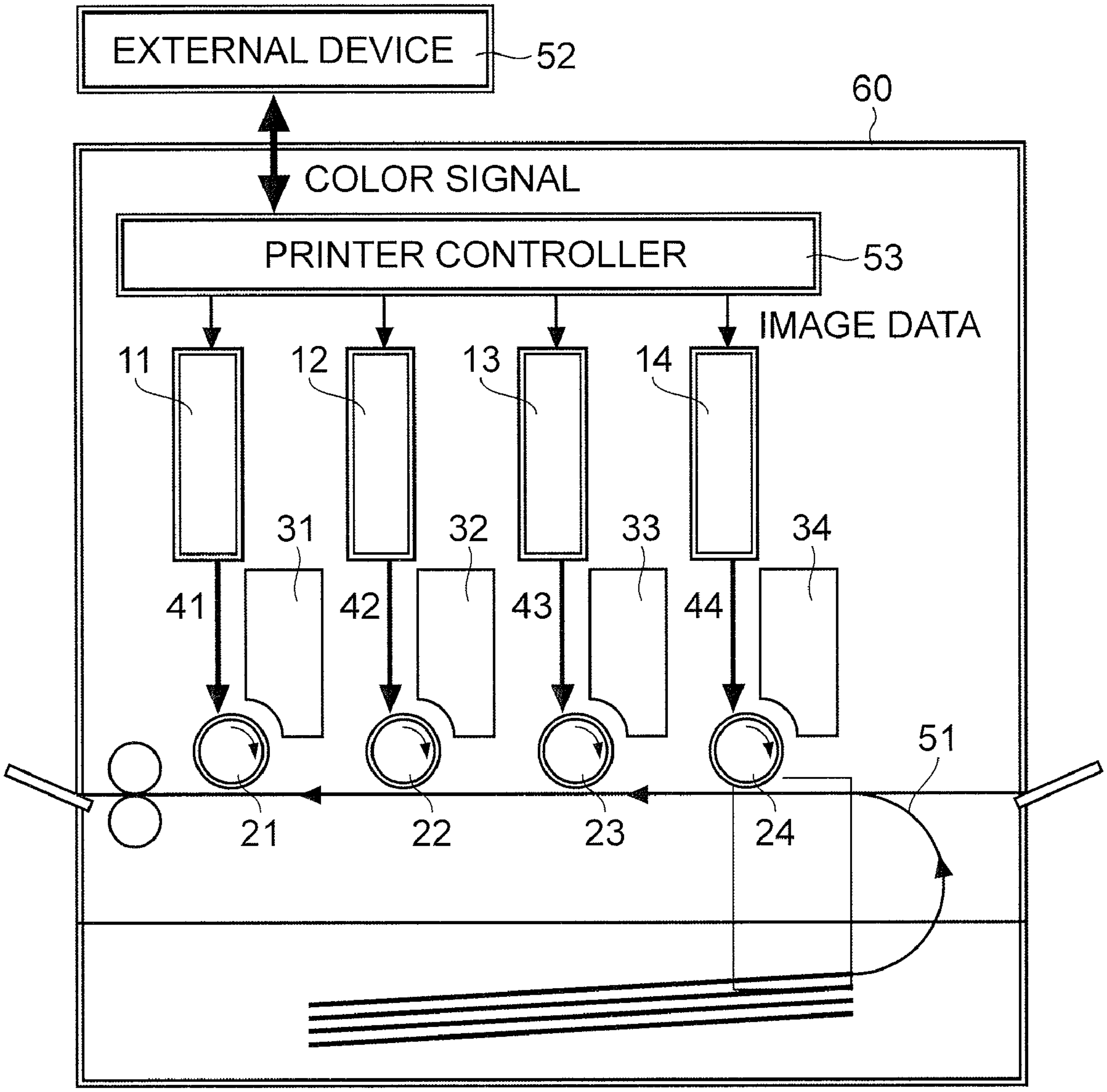
FIG. 20 is a schematic diagram illustrating a color image-forming apparatus according to another exemplary embodiment of the present invention.

FIG. 20 is a schematic diagram illustrating the main portion of a color image-forming apparatus according to another exemplary embodiment of the present invention. In the present exemplary embodiment, the color image-forming apparatus is of a tandem type in which four optical scanning apparatus can be arranged and image information can be recorded in parallel on surfaces of photosensitive drums that function as image carriers. Referring to FIG. 20, a color image-forming apparatus 60 includes optical scanning apparatus 11, 12, 13 and 14, which each have the structure according to one of the above-described first to fifth exemplary embodiments, photosensitive drums 21, 22, 23 and 24 which each can function as an image carrier, developing devices 31, 32, 33 and 34, and a conveying belt 51.

Referring to FIG. 20, the color image-forming apparatus 60 receives red (R), green (G), and blue (B) signals from an external device 52, such as a personal computer. These signals are respectively converted into cyan (C), magenta (M), yellow (Y), and black (K) image data elements by a printer controller 53 included in the color image-forming apparatus 60. The image data elements are input to the corresponding optical scanning apparatuses 11, 12, 13 and 14, respectively. The optical scanning apparatuses 11, 12, 13 and 14 emit light beams 41, 42, 43, and 44 modulated in accordance with the respective image data elements, and photosensitive surfaces of the photosensitive drums 21, 22, 23 and 24 are scanned in the main scanning direction by the light beams 41, 42, 43, and 44, respectively.

In this color image-forming apparatus 60, four optical scanning apparatuses 11, 12, 13 and 14 corresponding to cyan (C), magenta (M), yellow (Y), and black (K), respectively, can be arranged and image signals (image information) are recorded in parallel on the surfaces of the photosensitive drums 21, 22, 23 and, 24, respectively. Accordingly, color images can be printed at a high speed.

In the color image-forming apparatus 60 according to the present exemplary embodiment, the four optical scanning apparatus 11, 12, 13, and 14 form four latent images of the respective colors on the surfaces of the photosensitive drums 21, 22, 23 and 24 using light beams based on the respective image data elements. Then, the images are transferred onto the paper sheet so that a single full-color image is formed thereon.

The external device 52 can include, for example, a color image reading apparatus, which can have a CCD sensor. In this case, a system including the color image reading apparatus and the color image-forming apparatus 60 can function as a color digital copying machine.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

What is claimed is:

1. An optical scanning apparatus comprising:

a Vertical Cavity Surface Emitting Laser including a plurality of light-emitting portions that are spaced from each other in at least a sub-scanning direction, wherein the plurality of light-emitting portions emits a plurality of light beams;

a first optical system including a light-condensing element that converts the plurality of light beams into a combined light beam in another state;

a deflecting unit that reflects the combined light beam from the first optical system;

a diaphragm disposed in a optical path between the laser and the deflecting unit; and a second optical system that focuses the reflected combined light beam on a surface to be scanned, wherein a principal ray of a light beam emitted from one of the plurality of light-emitting portions that is farthest from an optical axis in the sub-scanning cross section passes through a plurality of optical elements included in the first and second optical systems, the principal ray being farthest from the optical axis in the sub-scanning cross section when the principal ray passes through the optical surface of optical element adjacent to the diaphragm, and wherein the optical surface of optical element adjacent to the diaphragm has a non-arc shape in a sub-scanning cross section.

2. The optical scanning apparatus according to claim 1, wherein variation directions of field curvatures due to variation in a field angle in the sub-scanning direction caused by the first optical system and the second optical system in the sub-scanning direction are opposite to each other.

3. The optical scanning apparatus according to claim 1, wherein variation directions of distortions due to variation in a field angle in the sub-scanning direction caused by the first optical system and the second optical system in the sub-scanning direction are opposite to each other.

4. An image-forming apparatus comprising:

an optical scanning apparatus according to claim 1, which emits light beams;

a photosensitive body disposed on the surface to be scanned;

a developing device that forms a toner image by developing an electrostatic latent image formed on the photosensitive body by the light beams emitted from the optical scanning apparatus;

a transferring device that transfers the toner image onto a transferring material; and a fixing device that fixes the toner image transferred onto the transferring material.

5. An image-forming apparatus comprising:

an optical scanning apparatus according to claim 1; and a printer controller that converts code data received from an external device into an image signal and inputs the image signal to the optical scanning apparatus.

6. A color-image-forming apparatus comprising:

a plurality of the optical scanning apparatus according to claim 1; and a plurality of image carriers respectively arranged on the surface to be scanned of the optical scanning apparatus and forming images of different colors.

7. The color-image-forming apparatus according to claim 6, further comprising a printer controller that converts color signals input from an external device into color image data elements and inputs the color image data elements to the respective optical scanning apparatus.

* * * * *